United States Patent
Ziedan et al.

(10) Patent No.: US 8,031,112 B2
(45) Date of Patent: Oct. 4, 2011

(54) SYSTEM AND METHOD FOR HIGH DYNAMIC ACQUISITION AND TRACKING OF SIGNALS FROM THE GLOBAL POSITIONING SYSTEM

(75) Inventors: Nesreen Ibrahim Ziedan, Oxford, OH (US); James Levi Garrison, Jr., Lafayette, IN (US)

(73) Assignee: Purdue Research Foundation, Office of Technology Commercialization, West Lafayette, IN (US)

( * ) Notice: Subject to any disclaimer, the term of this patent is extended or adjusted under 35 U.S.C. 154(b) by 378 days.

(21) Appl. No.: 11/290,982

(22) Filed: Nov. 30, 2005

(65) Prior Publication Data

US 2006/0115022 A1  Jun. 1, 2006

Related U.S. Application Data

(60) Provisional application No. 60/632,051, filed on Nov. 30, 2004, provisional application No. 60/554,660, filed on Mar. 19, 2004, provisional application No. 60/604,333, filed on Aug. 25, 2004.

(51) Int. Cl.
*G01S 19/24* (2010.01)
*G01S 19/26* (2010.01)

(52) U.S. Cl. .................. 342/357.63; 342/357.65

(58) Field of Classification Search .......... 342/357.06, 342/357.12, 357.13, 357.15, 357.63, 357.65, 342/357.71, 357.78; 375/143, 340–341, 375/343, 350
See application file for complete search history.

(56) References Cited

U.S. PATENT DOCUMENTS

| | | | | |
|---|---|---|---|---|
| 5,019,824 A | * | 5/1991 | Kumar | 342/195 |
| 5,867,411 A | * | 2/1999 | Kumar | 708/300 |
| 6,535,114 B1 | * | 3/2003 | Suzuki et al. | 340/435 |
| 6,535,833 B1 | * | 3/2003 | Syrjarinne | 702/150 |
| 6,664,923 B1 | | 12/2003 | Ford | |
| 2005/0179580 A1 | * | 8/2005 | Cong et al. | 342/70 |
| 2006/0015250 A1 | * | 1/2006 | Kim | 701/213 |

* cited by examiner

*Primary Examiner* — Dao L Phan
(74) *Attorney, Agent, or Firm* — Maginot, Moore & Beck LLP

(57) ABSTRACT

A method of acquiring a signal includes generating a first set of acquired signal power values comprising an acquired signal power value for each of a plurality of Doppler bins over a first predetection integration time (PIT) interval, and generating a second set of acquired signal power values comprising an acquired signal power value for each of the plurality of Doppler bins over a second subsequent PIT interval. The first and the second sets are used to generate at least three additional sets of acquired signal power values. A new set is generated by selecting the maximum of the summations for each Doppler bin from the three additional sets, and a Doppler shift is identified from the Doppler bin having the maximum summation value. The output may be used to initialize a first and a second extended Kalman filters for tracking a carrier signal and a code signal, respectively.

20 Claims, 10 Drawing Sheets

SYSTEM AND METHOD FOR HIGH DYNAMIC ACQUISITION AND TRACKING OF SIGNALS FROM THE GLOBAL POSITIONING SYSTEM

This application claims the benefit of the following applications: U.S. Provisional Patent Application Ser. No. 60/632,051 having a filing date of Nov. 30, 2004, pending U.S. patent application entitled "Method and Apparatus for Detecting and Processing GPS Signals" having Ser. No. 11/087,065 and a filing date of Mar. 21, 2005 that claims priority from Provisional Patent Application Ser. No. 60/554,660 having a filing date of Mar. 19, 2004, pending U.S. patent application entitled "System and Method for Acquiring Weak Signals in a Global Positioning Satellite System" having Ser. No. 11/212,125 and a filing date of Aug. 25, 2005 that claims priority from Provisional Patent Application 60/604,333 having a filing date of Aug. 25, 2004, the disclosure of each application being incorporated in its entirety herein by reference.

FIELD OF THE INVENTION

This disclosure relates to global positioning system receivers, and more particularly, to signal processing methods for acquiring and tracking signals from positioning satellites.

BACKGROUND OF THE INVENTION

The Global Positioning System (GPS) is a satellite-based location system. In the GPS, several satellites orbiting the earth provide signal codes that are detected by receivers. The receivers use the codes to lock onto the satellite signal. The receiver then measures the time of arrival of the satellite signal against an internal clock, which indicates a delay from the satellite. Such delays are determined for at least four different satellites. Those delays translate to distances. Because the distances to each of four satellites are known, and because the position of the satellites are known, the X, Y, and Z coordinates of the user may be calculated, as well as the user's clock error. This method is known as pseudo-ranging, and systems other than GPS use similar technology.

The delay between transmission of a satellite and reception by a receiver is obtained by causing the receiver to latch onto a repetitive code of a particular satellite. To this end, the receiver generates the code of each satellite in a repetitive pattern and then, for a particular satellite, tries to line up the internally generated code with the received code from the satellite. To "line up" the internally generated code, the internally generated code sequence must be delayed by some amount. This delay provides the time measurement from the internal clock, $Code_{sat1}(t) = Code_{rec}(t + \delta_1)$, where $\delta_1$ is a delay value. The baseband signal Code(t) can take values of +1 or −1 and is generated by a known algorithm. By aligning internal codes of other satellites with corresponding internal codes, other delay values may be obtained. Thus, for three other satellites, delay values $\delta_2$, $\delta_3$, and $\delta_4$ may be generated. Then, by obtaining the position information for those satellites $(x_j, y_j, z_j)$ for $j=\{1, 2, 3, 4\}$, a system of equations may be set up to determine the location of the receiving device.

The system of equations is derived from the equation for the distance between a satellite and the receiver in terms of delay, which may be expressed as: Distance=$\delta_j$*C (speed of light). However, the measured delay does not provide an absolute delay value because the clock in the receiver is not necessarily synchronized to the satellites, which are synchronized together and to a master clock on the ground. So the actual distance between a satellite n and the receiver is the measured delay $\delta_j$, plus a receiver clock offset $T_{off}$, times the speed of light. Thus, the following system of equations can be set up:

$$(\delta_1 + T_{off})^*C = [(x_1-x_r)^2 + (y_1-y_r)^2 + (z_1-z_r)^2]^{1/2}$$

$$(\delta_2 + T_{off})^*C = [(x_2-x_r)^2 + (y_2-y_r)^2 + (z_2-z_r)^2]^{1/2}$$

$$(\delta_3 + T_{off})^*C = [(x_3-x_r)^2 + (y_3-y_r)^2 + (z_3-z_r)^2]^{1/2}$$

$$(\delta_4 + T_{off})^*C = [(x_4-x_r)^2 + (y_4-y_r)^2 + (z_4-z_r)^2]^{1/2}$$

The above four equations amount to four equations with four unknown variables, which may then be solved for the receiver position $x_r$, $y_r$, $z_r$, as well as the offset of the receiver clock $T_{off}$. Because the speed of light is 286,000 miles per second, even a small discrepancy in a delay measurement $\delta_j$ that is used to compute the distance from the distance equation already noted, can result in significant inaccuracy.

Accurate alignment of the internal and external codes to get a precise delay number for position calculation is important. To facilitate accurate alignment, the acquisition code sequence, known in the art as the C/A code, is 1023 bits and repeated periodically every 1 millisecond. By superimposing the internal code over the received code for multiple instances of the code, a correlation technique may be used to filter out noise present in the signal. As the number of 1 millisecond periods used for correlation increases, the ability of the receiver to acquire weak signals for position calculation increases.

The practical number of subsequent sequences of the C/A code that may be used is hindered, however, by the fact that the C/A code is in fact superimposed over another signal, referred to as the data signal, which has a pulse width of 20 milliseconds. The data signal contains the time and location information for the satellite, among other things. Before the signal is acquired, the data signal is unknown to the receiver, and appears as a random signal. Because the receiver does not know the data signal, the receiver does not know the effects of the data signal on the C/A sequences. Changes in the data signal from a +1 to a −1 value reverse the sign of a portion of the C/A sequences. Moreover, although there are 20 repetitions of the C/A sequence for every data signal value, the receiver does not have a priori knowledge of when the transitions of the data signal occur. Accordingly, the imposition of the data signal makes the use of multiple C/A sequences to achieve acquisition of the C/A code for weak GPS signals difficult.

Another problem for signal acquisition arises from the line of sight acceleration of the receiver relative to the satellite as it attempts to acquire a signal from a positioning satellite. If the receiver is accelerating, the Doppler shift changes with a rate that depends on the relative line of sight between the satellite and the receiver. A change in the Doppler shift causes a change in the length of the C/A code duration. This rate of change in the Doppler shift affects the acquisition and the tracking of the signal from the positioning satellites. The situation in which an accelerating receiver acquires and tracks a positioning signal is sometimes called a high dynamic environment. What is needed is a receiver that better estimates the effect of a high dynamic environment on the acquisition and tracking of a positioning signal.

SUMMARY OF THE INVENTION

Methods for acquiring and tracking a signal in a high dynamic environment are disclosed herein. One method for acquiring a signal in a high dynamic environment includes generating a first set of acquired signal power values, the first set comprising an acquired signal power value for each Doppler bin in a plurality of Doppler bins over a first predetection integration time (PIT) interval for processing a digital signal, and generating a second set of acquired signal power values, the second set comprising an acquired signal power value for each Doppler bin in the plurality of Doppler bins over a second subsequent predetection integration time (PIT) interval for processing the digital signal. The first and the second sets are used to generate at least three additional sets of acquired signal power values. One of the additional sets of acquired signal power values is a set of summations of the acquired power value for each Doppler bin in the first set of values with the acquired power value for the Doppler bin in the second set of acquired power signal values. Another of the additional sets of acquired signal power values correspond to a set of summations of the acquired power value for each Doppler bin in the first set of acquired power values with the acquired power value for the Doppler bin in the second set that precedes the Doppler bin in the first set of acquired power values, and the other of the additional sets of acquired signal power values is a set of summations of the acquired power value for each Doppler bin in the first set of acquired power values with the acquired power value for the Doppler bin in the second set that follows the Doppler bin in the first set of acquired power values. A new set of acquired power values is generated by selecting the maximum of the summations for each Doppler bin from the three additional sets, and a Doppler shift is identified from the Doppler bin having the maximum summation value that is greater than a threshold value.

A method for tracking signals in a global positioning system includes tracking a carrier signal with a first extended Kalman filter (EKF), and tracking a code signal with a second EKF. The tracking method operates the first extended EKF with a first integration time, and operates the second EKF with a second integration time. These integration times may be adaptively adjusted in response to signal level and decoding signal error rates. The tracking method may also include decoding a navigational data message in a weak signal with reference to repeated portions of a navigational message.

A receiver for acquiring and tracking signals in a global positioning system includes a first extended Kalman filter (EKF), a second EKF, and the output of the first EKF being used by the second EKF for tracking a code signal and the output of the second EKF being used by the first EKF for tracking a carrier signal. The integration times used by the first and the second EKFs are adaptively adjusted in response to signal level and decoding signal error rate. Large carrier errors and code delay errors are corrected by a re-initialization process and a reacquisition process, respectively.

DETAILED DESCRIPTION

Figure 1:
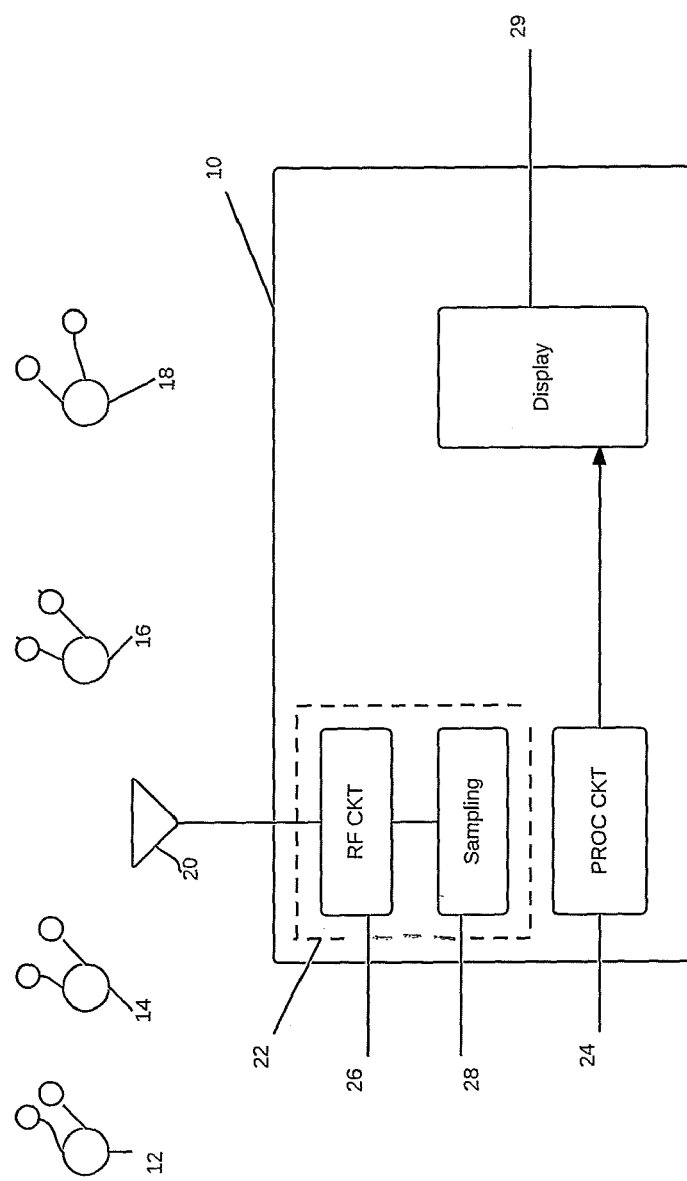
FIG. 1 shows a block diagram of a GPS receiver and four GPS satellites according to an exemplary embodiment of the present invention.

FIG. 1 shows a block diagram of an apparatus 10 for receiving and processing GPS signals, in an environment in which the apparatus 10 receives RF GPS signals from a minimum of four satellites 12, 14, 16 and 18. The receiver 10 includes an antenna 20, an input circuit 22 and a processing circuit 24. The input circuit 22 is operably connected to receive RF GPS signals detected by the antenna, and to convert the signals into digital IF signals. As is known in the art, GPS signals are transmitted on the known L1 carrier frequency 1575.42 MHz. In the embodiment described herein, the input circuit 22 includes an RF processing circuit 26 and a sampling unit 28. The RF processing unit 26 includes filtering, amplification and frequency conversion equipment known in the art, and is capable of generating an analog IF signal from the 1575.42 signal. The sampling unit 28 is a device operable to sample, and preferably downsample, the analog IF signal in order to generate the digital code signal.

As is known in the art, the broadcast signal consists of a transmitted code (from one of the satellites 12, 14, 16 and 18) plus a noise element. The received signal may thus be represented as:

$$r_q = A d_q c_q \cos(\Theta + f_d t_q) + n_q,$$

where $r_q$ is a received value at a sample index q, A is the amplitude of the transmitted signal, $d_q$ is the transmitted navigational data value at a sample q, $c_q$ is the transmitted C/A code value at the sample q, $\Theta$ is the phase, $f_d$ is the Doppler shift, and $n_q$ is the noise added at the sample q. The navigational data $d_q$ includes the position information provided by the satellite, each data bit having a duty cycle of 20 milliseconds, and each bit having a value of either −1 or +1.

Figure 2:
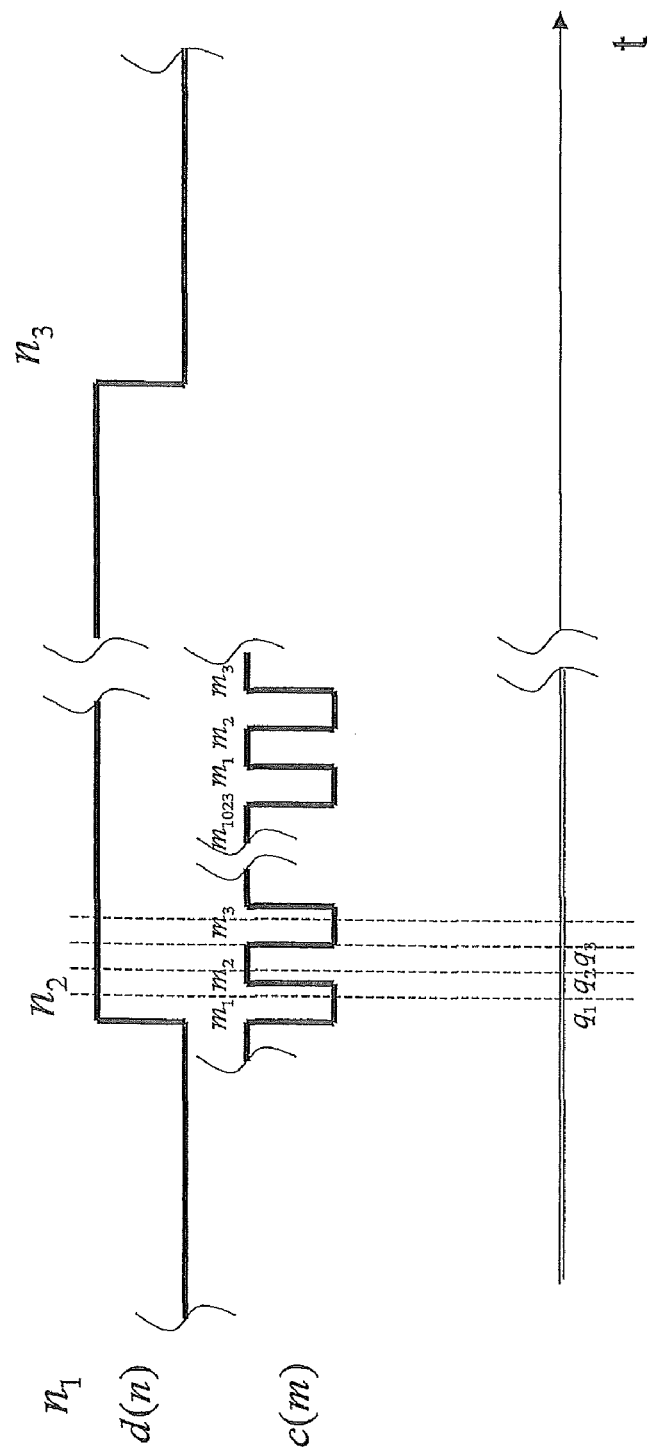
FIG. 2 shows a timing diagram of constituent elements of the GPS baseband signal.

FIG. 2 shows a timing diagram of the components of an exemplary transmitted signal including the data signal d(n) and the C/A code c(m). The rate of n is 50 Hz, while the rate of m is 1,023,000 chips/sec. As discussed above, there are 1023 code bits in the C/A code sequence for each satellite, and the C/A code sequence is repeated twenty times for each data signal bit d(n). FIG. 2 furthermore shows exemplary sample times q which are used to develop the received signal $r_q$. Thus, d(n), as used herein, represents the data signal value for a data signal bit indexed n, while $d_q$ represents the value of the data signal d(n) for each sample q that is taken. Similarly, $c_q$ represents the value of the data signal c(m) for each sample q that is taken.

In general, the processing circuit 24 is a digital processing circuit that is operable to acquire GPS signals using the digital code signal $r_q$. Acquiring a GPS signal means that the processing circuit 24 is able to identify a particular C/A code sequence unique to the satellite that transmitted the signal, successfully predict the starting time of the C/A code sequence, and estimate the Doppler shifted frequency, $f_d$, of the signal from the satellite. The processing circuit 24 is further operable to track the acquired code in a high dynamic environment using a method disclosed below, which allows the processing circuit to obtain the navigational data signal d(n) over time and to obtain finer alignment of the internal code with the received code.

The processing circuit 24 is also operable to generate a delay value representative of a delay between an internal code replica c'(m) and the code c(m) of the received signal $r_q$, in a high dynamic environment. This delay is the delay $\delta_n$, which was described above. To this end, in accordance with aspects of some embodiments of the invention, the processing circuit 24 is operable to perform long incoherent integrations using circular correlation or double block zero padding to acquire the C/A code c(m) and hence recovery of the navigation data bits d(n). The use of these methods is disclosed in our pending patent application entitled "System and Method for Acquiring Weak Signals in a Global Positioning Satellite System" having Ser. No. 11/212,125 that was filed on Aug. 25, 2005 and is owned by the assignee of this application. The acquisition method disclosed below that uses these techniques for incoherent integrations also helps determine a Doppler frequency shift caused by relative motion between one of the satellites and the receiver 10. The Doppler frequency is required because the frequency of C/A code bits as well as the frequency of the data bits shift from their expected frequencies. The knowledge of the Doppler frequency shift allows for accurate alignment of the internal C/A code replica with the received C/A code signal. The processing circuit 24 and the other circuits of the receiver are used to acquire $\delta_j$ values for each of the satellites 12, 14, 16, and 18.

The processing circuit 24 is further operable to receive the navigation data $d_j(n)$ for each satellite j in a high dynamic environment when the C/A code of the satellite is acquired and tracked using the method described below. The navigation data $d_j(n)$ provides the $x_j$, $y_j$, and $z_j$ position information for each satellite j. Once the position information and the delay information for four satellites 12, 14, 16 and 18 are known, the position of the receiver may be solved using the system of equations discussed above. To accomplish the foregoing, the processing circuit 24 may suitably be one or more microprocessors, co-processors, digital signal processors, controllers, discrete or custom processing devices or combinations thereof.

Figure 3:
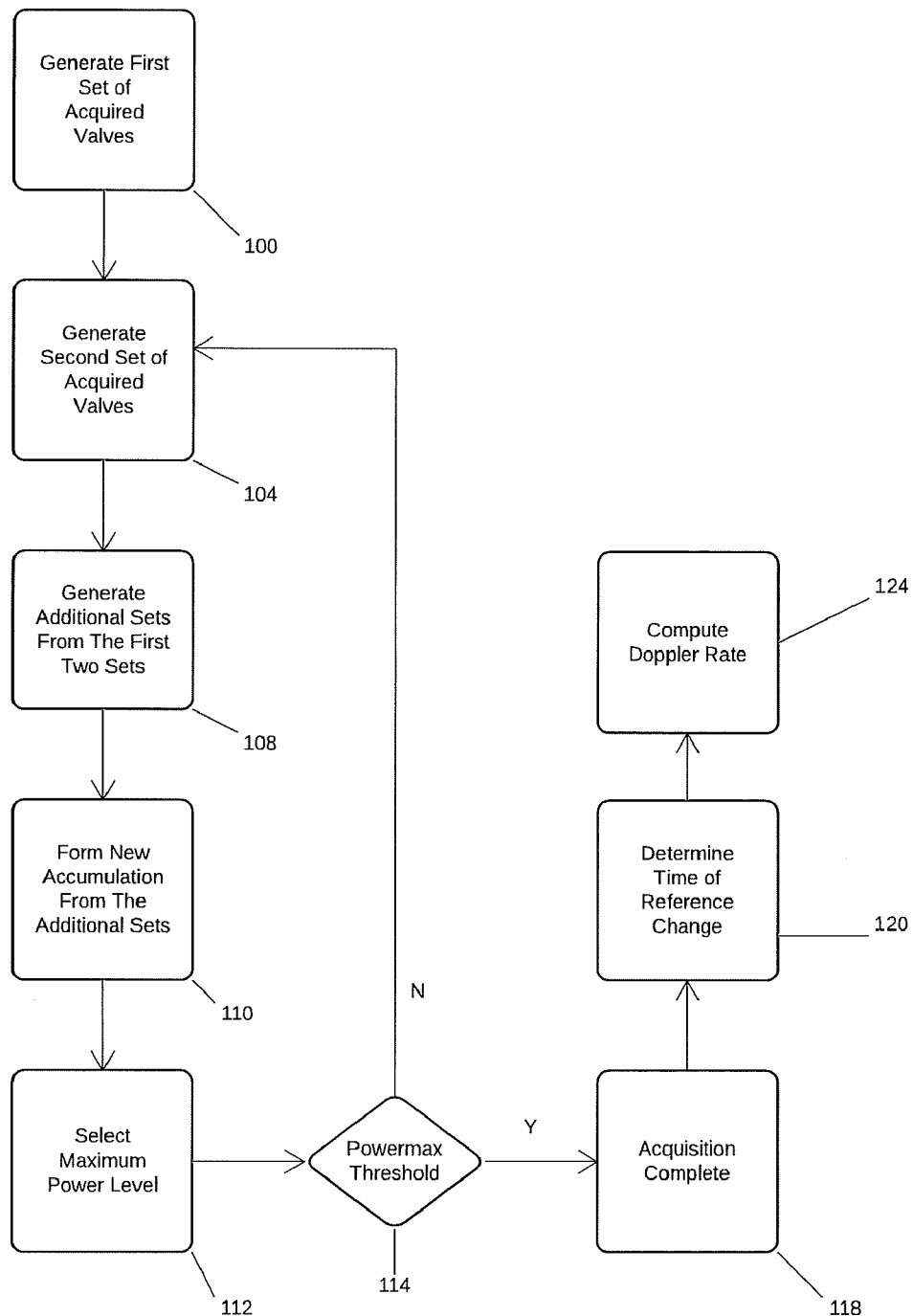
FIG. 3 shows a flow diagram of an exemplary set of operations for the processing circuit of the GPS receiver in FIG. 1.

An exemplary acquisition process performed in a high dynamic environment that may be implemented by the processing circuit 24 is shown in FIG. 3. The process identifies the most likely frequency, $f_{d_{Cl}}$, that corresponds to the average Doppler shift, $f_{d_{avl}}$, after each step I of the total acquisition steps L and accumulates the power of those frequencies together. If $P_{t_{Cl}}$ defines the total power of the closest Doppler bins in all of the L steps, and $P_{f_{dCl}}$ defines the power in the closest Doppler bin in the $I^{th}$ step, then $$P_{t_{Cl}} = \sum_{l=1}^{L} P_{f_{dCl}}.$$

Once a signal has been acquired, the estimated Doppler shift is defined by $f_{d_{Cl}}$.

The estimated Doppler shift $f_{d_{Cl}}$ refers to the same Doppler bin for at most $S_c$ steps, where $$S_c = \left\lfloor \frac{\mu}{|\alpha_{max}|T_l^2} \right\rfloor + 1 \text{ steps,}$$

$\lfloor x \rfloor$ is the floor function, and $\alpha_{max}$ is the largest expected Doppler rate. Therefore, the estimated Doppler shift need not be tested for each step I. Because the location of the initial $f_{d_{avl}}$ relative to $f_{d_{Cl}}$ is not known, a limit is established on the maximum number of allowed consecutive accumulations between test. One limit that may be used is $$S_m = \left\lceil \frac{S_c}{4} \right\rceil.$$

The Doppler rate may be positive or negative. Therefore, the process of FIG. 3 begins by determining, for the first $S_m$ steps, a set of acquired signal power values for a plurality of Doppler bins over a first prediction integration time (PIT) (block 100). The Doppler bins are preferably separated by $1/T_I$ KHz. The acquired signal power values may be obtained by the circular correlation technique or the double block zero padding technique disclosed in the co-pending application noted above. The result may be denoted as $P_I$, which is a $N_T \times N_{f_d}$ matrix, where $N_T$ is the number of code delays and $N_{f_d}$ is the number of Doppler bins. A second set of acquired signal power values for the plurality of Doppler bins is calculated for the next $S_M$ steps of a second PIT interval (block 104). This second set of values may be determined as an incoherent accumulation as was the first set of values and may be denoted as $RS_{m,1}$. The process then generates three additional sets of acquired power values from the first two sets (block 108). The first additional set is formed by adding the acquired values for the same Doppler bins in the first set and the second set of acquired values. The second additional set is formed by adding the acquired value for a Doppler bin in the second set of acquired values with the acquired value for the adjacent Doppler bin in the first set of acquired values that precedes the Doppler bin in the second set of values. The third additional set is formed by adding the acquired value for the Doppler bin in the second set of acquired values with the acquired value for the adjacent Doppler bin in the first set of acquired values that follows the Doppler bin in the second set. These three additional sets may be defined as:

$$Q_{t,1}(\tau_u, f_{d_v}) = R_{S_{m,1}}(\tau_u, f_{d_v}) + P_1(\tau_u, f_{d_v})$$

$$Q_{t,2}(\tau_u, f_{d_v}) = R_{S_{m,1}}(\tau_u, f_{d_v}) + P_1(\tau_u, f_{d_{v+1}})$$

$$Q_{t,3}(\tau_u, f_{d_v}) = R_{S_{m,1}}(\tau_u, f_{d_v}) + P_1(\tau_u, f_{d_{v-1}})$$

The value for each bin in the first additional set, $Q_{t,1}$ is compared with the value for the corresponding bin in the other two additional sets, $Q_{t,2}$ and $Q_{t,3}$, and the maximum value is selected to form a new total accumulation, $P_2$ (block 110). The new total accumulation may be defined as:

$$P_2(\tau_u, f_{d_v}) = \max\{Q_{t,1}(\tau_u, f_{d_v}), Q_{t,2}(\tau_u, f_{d_v}), Q_{t,3}(\tau_u, f_{d_v})\}$$

The maximum value in the new total accumulation is selected and compared to a threshold (blocks 112, 114) and if it exceeds the threshold the acquisition is complete (block 118). Otherwise, a new accumulation is performed over the next $S_m$ steps (block 104), three new additional sets are generated (block 108), a new total accumulation, $RS_{m,2}$, determined (block 110) and the maximum value compared to the threshold (block 114) to determine whether an acquisition is complete. In the generation of the three new additional sets, the values of $P_2$ and $RS_{m,2}$ are used.

The effect of Doppler shift on the code length causes the signal power to appear at different code delays. The circular correlation and double block zero padding used in the process, however, encompass this effect. Therefore, the Doppler bins are added at the correct code delay and no additional steps are consequently needed.

After the acquisition is concluded, an approximate Doppler rate is determined by the processing circuit 24, as shown in FIG. 3. The time in which the Doppler bin, $f_{d_{Cl}}$, closest to the Doppler shift, $f_{d_{avl}}$, changes its reference from one bin to an adjacent bin is determined (block 120). A factor $\alpha$ is computed from the Doppler bins associated with the change in reference (block 124). This factor is approximately $$\frac{f_{d_2} - f_{d_1}}{t_2 - t_1},$$

where $f_{d_2}$ is the Doppler bin with the maximum power at $t_2$ and $f_{d_1}$ is the Doppler bin with the maximum power at $t_1$. The factor $\alpha$ is the Doppler rate.

After acquisition and fine acquisition are completed, an approximate Doppler shift, $f_{d_{est}}$, Doppler rate, $\alpha_{est}$, phase, $\phi_{est}$, and code delay, $\tau_{est}$, are obtained and used to initialize a code tracking module and a carrier tracking module implemented with the processing circuit 24. The in-phase and quad-phase local signals may modeled as:

$$I_{L_k}(\Delta) = C_{L_k}(\Delta)\cos(\phi_{est} + 2\pi f_{d_{est}} t_k + \pi \alpha_{es} t_k^2)$$

$$Q_{L_k}(\Delta) = -C_{L_k}(\Delta)\sin(\phi_{est} + 2\pi f_{d_{est}} t_k + \pi \alpha_{es} t_k^2),$$

where $C_L$ is the replica code and $\Delta$ is the amount of shift induced in the replica code to generate the prompt, early, and late signals. Tracking aligns the local replica code with the received code. Consequently, the replica is modeled as $$C_{L_k}(\Delta) = C\left((t_k + \Delta)\left(1 + \frac{f_{d_{est}} + \alpha_{est} t_k / 2}{f_{L1}}\right)\right)$$

so the model for the received code and data are modified to be:

$$C_k = C\left((t_k - (\tau - \tau_{est}))\left(1 + \frac{f_d + \alpha t_k / 2}{f_{L1}}\right)\right) \text{ and } d_k =$$

$$d\left((t_k - (\tau - \tau_{est}))\left(1 + \frac{f_d + \alpha t_k / 2}{f_{L1}}\right)\right),$$

where $\tau$, $\phi$, $f_d$, and $\alpha$ are the true delay, phase, Doppler shift, and Doppler rate, respectively. The local signals are correlated with the received signals to generate:

$$I_i(\Delta) = \sqrt{\frac{1}{N_{t_i}}} \sum_{j=st}^{st+N_{T_i}} I_{L_j}(\Delta) r_j \text{ and } Q_i(\Delta) = \sqrt{\frac{1}{N_{t_i}}} \sum_{j=st}^{st+N_{T_i}} Q_{L_j}(\Delta) r_j,$$

where $T_i$ is the integration time, st is the index of the first sample in the $i^{th}$ integration, and $N_{T_i}$ is the number of samples in the $i^{th}$ integration time. Multiplication of the square root factor for $N_{T_i}$ keeps the noise variance equal to 1. Thus, the accumulated signals may be modeled as:

$$I_i(\Delta) = A_i d_i R(\Delta + (\tau - \tau_{est}))\cos(\phi_{ei}) + n_{I_i} \text{ and } Q_i(\Delta) = A_i d_i R(\Delta + (\tau - \tau_{est}))\sin(\phi_{ei}) + n_{Q_i},$$

where $R(\Delta + (\tau - \tau_{est}))$ is the autocorrelation function of the code and $\phi_e$ is the average phase error over $T_i$.

Because the received signal is sampled at the frequency $f_s$, the timing of the first sample in the next received code is estimated and used to generate the replica code that begins at a shift equal to the difference between the start of the next received code, tsNext, and the start of the first sample, tsFirst. The start of the first sample in the replica code is tsFirstLocal. The first received sample start time is $t_0$. Thus, the timing of all samples in the received signal satisfy the condition $$\left((t_k - t_0) \bmod \frac{1}{f_s}\right) = 0.$$

If tsNext satisfies this condition, then tsFirst=tsNext and tsFirstLocal=$t_0$. If tsNext does not satisfy this condition, then tsFirst=tsNext+1/$f_s$−(tsNext mod 1/$f_s$) and tsFirstLocal=$t_0$+1/$f_s$−(tsNext mod 1/$f_s$). The estimated duration of data having size $T_i$ is $$estTiDuration = T_i\left(\frac{f_{L1}}{f_{L1} + f_{d_{est}} + \alpha_{est} T_i / 2}\right).$$

Once a replica code is generated, it is used to generate the prompt, early and late correlated signals. The replica code has a duration of estTiDuration+2$\Delta$, where $\Delta$ is the early/late delay, which is chosen to be a multiple of the sample time $N_s$ as long as it does not exceed the duration of a half code chip. Therefore, $\Delta$=$N_s/f_s$ and the start sampling time is tStartCode=tsFirstLocal−$\Delta$ and the end sampling time is tEndCode=estTiDuration−(estTiDuration mod 1/$f_s$)+$\Delta$. Accordingly, the prompt, early, and late correlated signals are generated by correlating the samples of the current received data duration $T_i$ with the replica code with start and end times defined as tStartEarly=tStartCode, tStartPrompt=tStartCode+($N_s/f_s$), tStartLate=tStartCode+2$N_s/f_s$, tEndEarly=tEndCode−2$N_s/f_s$, tEndPrompt=tEndCode−$N_s/f_s$, and tEndLate=tEndCode. The prompt signal is preferably generated with an integration time of 1 msec and used within the Viterbi algorithm and the extended Kalman filter to estimate the bit edge position, the date sequence, the phase, the frequency error, and the Doppler rate as set forth in our co-pending application entitled "Method and Apparatus for Detecting and Processing GPS Signals" having Ser. No. 11/087,065 that was filed on Mar. 21, 2005 and is commonly owned by the assignee of this application. This output is used in the extended Kalman filter (EKF) that is used for code tracking.

Figure 4:
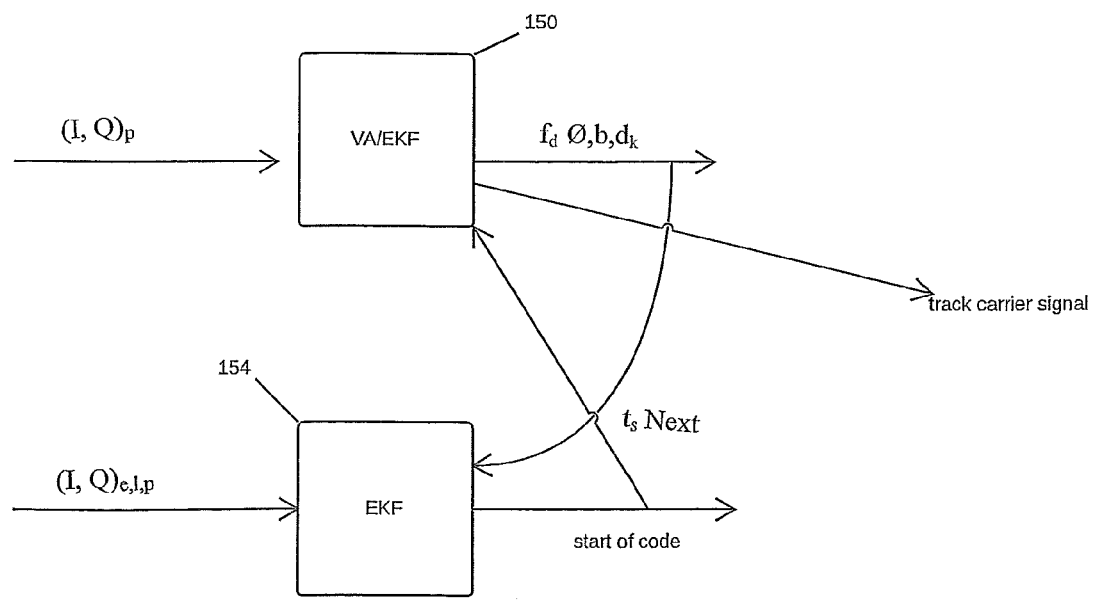
FIG. 4 shows a block diagram of a GPS signal tracking system implemented with the processing circuit of FIG. 1.

The modules implemented by processing circuit 24 for tracking are shown in FIG. 4. As shown there, separate EKFs are used for tracking the carrier and the code signals. The EKF 150 used for tracking the carrier signal processes the complex correlator outputs (I, Q)$_p$ for the prompt signal to generate the phase, frequency, data bits, and bit edge. These outputs are also provided to the EKF 154. The EKF 154 processes the complex correlator outputs (I, Q)$_{e,l,p}$ for the early, late, and prompt signals to generate the start of the code, which is also provided to the EKF 150. Each filter 150, 154 uses a different integration time. The EKF 150 used for carrier signal tracking is used with the Viterbi Algorithm (VA) and its integration time is one data bit interval. The EKF 154 for code tracking uses a combination of coherent and incoherent integrations with the coherent integrations being performed over an interval $N_t$, which is a multiple of one data bit intervals $T_i$. The duration of the received code is estimated from the current estimate of the Doppler shift and rate.

As shown in FIG. 4, the EKF 154 implemented by the processing circuit 24 for code tracking uses the output of the VA/EKF 150 used for carrier tracking. This output includes estimates for the phase, Doppler shift, Doppler rate, bit edge position, and data bit sequence. The output of the EKF 154 used for code tracking is used by the carrier tracking EKF 150 implemented by the processing circuit 24 to re-align the replica code with the received code for the purpose of minimizing loss caused by code misalignment in the 1 msec prompt signals used in the VA/EKF. The integration time for the code tracking EKF is $T_f = N_{incoh} N_t T_i$ where $N_{incoh}$ is the number of incoherent accumulations. The integration time for the carrier tracking VA/EKF is $T_i$. Thus, the EKF for tracking the code signal is updated once every $N_{incoh} N_t$ updates for the EKF tracking the carrier signal. For the carrier tracking that occurs during intervals in which the code tracking EKF does not produce output, the start of the next received code is calculated with reference to the current estimate for the code duration. In response to output from the code tracking EKF, the carrier tracking VA/EKF calculates the start of the next received code with reference to both the current estimate for the code duration and the current code delay error estimate.

The code tracking EKF 154 uses a measurement vector $z=h(\tau_e)+n$, where n is a noise term and $\hat{z}$ is an expected measurement while $\tau_e$ and $\tau_e^-$ are the code delay error and propagated error, respectively. $H_1$ and $H_{2k}$ are represented by $$\frac{\partial h(\tau_e^-)}{\partial \tau} \text{ and } \frac{\partial^2 h_k(\tau_e^-)}{\partial \tau^2},$$

respectively. First and second order filters may be used to implement the EKF 154 with the processing circuit 24. The first order filter uses the early and late signals, while the second order filter uses these signals as well as the prompt signals. For the high dynamic environment, the processing circuit 24 implements all of the EKFs with the form: $\tau_{e,i+1}=\Phi\tau_{e,i}+W_{\tau,i+1}$, where $W_\tau$ is a noise term and $\phi=1$.

The signals are generated for each data bit interval, which is preferably 20 msec, starting at the current estimated bit edge position. The signals are then added with reference to the predetection integration times (PIT) and total integration times. Two types of measurements may be used, coherent and incoherent measurements. For the coherent measurement, the general measurement vector is:

$$z_i = \begin{bmatrix} I_{E_{c_i}} \\ Q_{E_{c_i}} \\ I_{L_{c_i}} \\ Q_{L_{c_i}} \\ I_{P_{c_i}} \\ Q_{P_{c_i}} \end{bmatrix}$$

This vector is computed from the in-phase and quadrature correlations, and the data bit values from the VA/EKF as follows:

$$z_i = \begin{bmatrix} \sum_{j=g_i}^{g_i+N_t-1} \frac{1}{\sqrt{N_t}} \hat{d}_j I_j(-\Delta) \\ \sum_{j=g_i}^{g_i+N_t-1} \frac{1}{\sqrt{N_t}} \hat{d}_j Q_j(-\Delta) \\ \sum_{j=g_i}^{g_i+N_t-1} \frac{1}{\sqrt{N_t}} \hat{d}_j I_j(\Delta) \\ \sum_{j=g_i}^{g_i+N_t-1} \frac{1}{\sqrt{N_t}} \hat{d}_j Q_j(\Delta) \\ \sum_{j=g_i}^{g_i+N_t-1} \frac{1}{\sqrt{N_t}} \hat{d}_j I_j(0) \\ \sum_{j=g_i}^{g_i+N_t-1} \frac{1}{\sqrt{N_t}} \hat{d}_j Q_j(0) \end{bmatrix}$$

The corresponding general expected measurement is:

$$\hat{z}_i = \begin{bmatrix} \sum_{j=g_i}^{g_i+N_t-1} \frac{1}{\sqrt{N_t}} \hat{A}_j \cos(\hat{\theta}_{e_j}) \hat{R}(-\Delta) \\ \sum_{j=g_i}^{g_i+N_t-1} \frac{1}{\sqrt{N_t}} \hat{A}_j \sin(\hat{\theta}_{e_j}) \hat{R}(-\Delta) \\ \sum_{j=g_i}^{g_i+N_t-1} \frac{1}{\sqrt{N_t}} \hat{A}_j \cos(\hat{\theta}_{e_j}) \hat{R}(\Delta) \\ \sum_{j=g_i}^{g_i+N_t-1} \frac{1}{\sqrt{N_t}} \hat{A}_j \sin(\hat{\theta}_{e_j}) \hat{R}(\Delta) \\ \sum_{j=g_i}^{g_i+N_t-1} \frac{1}{\sqrt{N_t}} \hat{A}_j \cos(\hat{\theta}_{e_j}) \hat{R}(0) \\ \sum_{j=g_i}^{g_i+N_t-1} \frac{1}{\sqrt{N_t}} \hat{A}_j \sin(\hat{\theta}_{e_j}) \hat{R}(0) \end{bmatrix}$$

The general linearized function is:

$$H_{1i} = \frac{\partial h_i}{\partial \tau}\bigg|_{\tau_{e_i}=\tau_{e_i}^-} = \begin{bmatrix} \sum_{j=g_i}^{g_i+N_t-1} \frac{1}{\sqrt{N_t}} \hat{A}_j \cos(\hat{\theta}_{e_j}) \frac{\partial \hat{R}(-\Delta+\tau_{e_i})}{\partial \tau} \bigg|_{\tau_{e_i}=\tau_{e_i}^-} \\ \sum_{j=g_i}^{g_i+N_t-1} \frac{1}{\sqrt{N_t}} \hat{A}_j \sin(\hat{\theta}_{e_j}) \frac{\partial \hat{R}(-\Delta+\tau_{e_i})}{\partial \tau} \bigg|_{\tau_{e_i}=\tau_{e_i}^-} \\ \sum_{j=g_i}^{g_i+N_t-1} \frac{1}{\sqrt{N_t}} \hat{A}_j \cos(\hat{\theta}_{e_j}) \frac{\partial \hat{R}(\Delta+\tau_{e_i})}{\partial \tau} \bigg|_{\tau_{e_i}=\tau_{e_i}^-} \\ \sum_{j=g_i}^{g_i+N_t-1} \frac{1}{\sqrt{N_t}} \hat{A}_j \sin(\hat{\theta}_{e_j}) \frac{\partial \hat{R}(\Delta+\tau_{e_i})}{\partial \tau} \bigg|_{\tau_{e_i}=\tau_{e_i}^-} \\ \sum_{j=g_i}^{g_i+N_t-1} \frac{1}{\sqrt{N_t}} \hat{A}_j \cos(\hat{\theta}_{e_j}) \frac{\partial \hat{R}(\tau_{e_i})}{\partial \tau} \bigg|_{\tau_{e_i}=\tau_{e_i}^-} \\ \sum_{j=g_i}^{g_i+N_t-1} \frac{1}{\sqrt{N_t}} \hat{A}_j \sin(\hat{\theta}_{e_j}) \frac{\partial \hat{R}(\tau_{e_i})}{\partial \tau} \bigg|_{\tau_{e_i}=\tau_{e_i}^-} \end{bmatrix}$$

For the incoherent measurement, the general measurement vector is:

$$z_i = \begin{bmatrix} I_{Einc_i} \\ Q_{Einc_i} \\ I_{Linc_i} \\ Q_{Linc_i} \\ I_{Pinc_i} \\ Q_{Pinc_i} \end{bmatrix}$$

which is computed from the measurements and the output of the VA/EKF as follows:

$$z_i = \frac{1}{\sqrt{2N_{incoh}}} \begin{bmatrix} \sum_{k=1}^{N_{incoh}} \left\{ \sum_{j=g_i+(k-1)N_t}^{g_i+kN_t-1} \frac{1}{\sqrt{N_t}} \hat{d}_j I_j(-\Delta) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{d}_j Q_j(-\Delta) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{d}_j I_j(\Delta) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{d}_j Q_j(\Delta) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{d}_j I_j(0) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{d}_j Q_j(0) \right\}^2 \end{bmatrix}$$

where $g_i$ is the index of the first data bit in the $i^{th}$ measurement interval, $\hat{d}$ is the estimated data bit value taken from the VA/EKF output, and $N_{incoh}$ is the number of incoherent accumulations. The general expected measurement vector is:

$$\hat{z}_i = \frac{1}{\sqrt{2N_{incoh}}} \begin{bmatrix} \sum_{k=1}^{N_{incoh}} \left\{ \sum_{j=g_i+(k-1)N_t}^{g_i+kN_t-1} \frac{1}{\sqrt{N_t}} \hat{A}_j \cos(\hat{\theta}_{e_j}) \hat{R}(-\Delta) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{A}_j \sin(\hat{\theta}_{e_j}) \hat{R}(-\Delta) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{A}_j \cos(\hat{\theta}_{e_j}) \hat{R}(\Delta) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{A}_j \sin(\hat{\theta}_{e_j}) \hat{R}(\Delta) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{A}_j \cos(\hat{\theta}_{e_j}) \hat{R}(0) \right\}^2 \\ \sum_{k=1}^{N_{incoh}} \left\{ \sum_{j=g_i+(k-1)N_t}^{g_i+kN_t-1} \frac{1}{\sqrt{N_t}} \hat{A}_j \sin(\hat{\theta}_{e_j}) \hat{R}(0) \right\}^2 \end{bmatrix}$$

where $\hat{A}, \hat{\Theta}_e$ are the VA/EKF output of the estimated signal level and the phase error at the midpoint of each data bit, respectively. $R(\hat{\Delta})$ is an approximation to the auto correlation function of the code, which depends on the design of the filter used in the RF circuitry 22. The general linearized vectors are:

$$H_{1i} = \frac{1}{\sqrt{2N_{incoh}}} \begin{bmatrix} \sum_{k=1}^{N_{incoh}} \left\{ \sum_{j=g_i+(k-1)N_t}^{g_i+kN_t-1} \frac{1}{\sqrt{N_t}} \hat{A}_j \cos(\hat{\theta}_{e_j}) \right\}^2 \frac{\partial \hat{R}(-\Delta+\tau_{e_i})^2}{\partial \tau} \\ \sum_{k=1}^{N_{incoh}} \left\{ \sum_{j=g_i+(k-1)N_t}^{g_i+kN_t-1} \frac{1}{\sqrt{N_t}} \hat{A}_j \sin(\hat{\theta}_{e_j}) \right\}^2 \frac{\partial \hat{R}(-\Delta+\tau_{e_i})^2}{\partial \tau} \\ \sum_{k=1}^{N_{incoh}} \left\{ \sum_{j=g_i+(k-1)N_t}^{g_i+kN_t-1} \frac{1}{\sqrt{N_t}} \hat{A}_j \cos(\hat{\theta}_{e_j}) \right\}^2 \frac{\partial \hat{R}(\Delta+\tau_{e_i})^2}{\partial \tau} \\ \sum_{k=1}^{N_{incoh}} \left\{ \sum_{j=g_i+(k-1)N_t}^{g_i+kN_t-1} \frac{1}{\sqrt{N_t}} \hat{A}_j \sin(\hat{\theta}_{e_j}) \right\}^2 \frac{\partial \hat{R}(\Delta+\tau_{e_i})^2}{\partial \tau} \\ \sum_{k=1}^{N_{incoh}} \left\{ \sum_{j=g_i+(k-1)N_t}^{g_i+kN_t-1} \frac{1}{\sqrt{N_t}} \hat{A}_j \cos(\hat{\theta}_{e_j}) \right\}^2 \frac{\partial \hat{R}(\tau_{e_i})^2}{\partial \tau} \\ \sum_{k=1}^{N_{incoh}} \left\{ \sum_{j=g_i+(k-1)N_t}^{g_i+kN_t-1} \frac{1}{\sqrt{N_t}} \hat{A}_j \sin(\hat{\theta}_{e_j}) \right\}^2 \frac{\partial \hat{R}(\tau_{e_i})^2}{\partial \tau} \end{bmatrix}$$

In the EKF 154 that only tracks the code signal, the second derivative is defined in one matrix $H_2$, where element k is $$H_{2k} = \frac{\partial^2 h_k}{\partial \tau^2} \bigg|_{\tau_e = \hat{\tau}_e^-}$$

and $z = h(\tau_e) + n$ and $\hat{\tau}_e^- = 0$ is the propagated code delay error. $H_2$ is used only in a second order EKF. The residual is calculated as $Res_i = z_i - \hat{z}_i$. In all of the EKFs, a gain $K_i$ is calculated. The start time of the next received code is estimated as $tsNext_{new} = tsNext_{old} + estTiDuration + K_i Res_i$, where $tsNext_{new}$ and $tsNext_{old}$ are the starting time of the next received code and the first received code in the last Ti interval, respectively. The (i−1) index is not used because in those steps in which the VA/EKF is updated, but the code tracking EKF is not updated, the start of the next code is estimated as $tsNext_{new} = tsNext_{old} + estTiDuration$, where $tsNext_{old|j} = tsNext_{new|j-1}$ and j is the step number in the carrier tracking VA/EKF.

The processing circuit 24 may implement one of two first order EKF filters for tracking the code signal. One EKF filter uses a four element measurement vector of the form: $z = [I_{Ec}\ Q_{Ec}\ I_{Lc}\ Q_{Lc}]^T$. The autocorrelation function is approximated by a triangle and may be expressed as:

$$\hat{R}(\tau) = 1 - \frac{|\tau|}{T_c}.$$

When $T_c$ is the duration of one chip and $f_c = 1/T_c$, then $$\frac{\partial R(-\Delta + \tau_e)}{\partial \tau} \bigg|_{\tau_e = \hat{\tau}_e^-} = \frac{1}{T_c}$$

and $$\frac{\partial R(\Delta + \tau_e)}{\partial \tau} \bigg|_{\tau_e = \hat{\tau}_e^-} = -\frac{1}{T_c}.$$

The measurement noise, as a result, is $$R = \begin{bmatrix} 1 & 0 & \left(1-2\frac{\Delta}{T_c}\right) & 0 \\ 0 & 1 & 0 & \left(1-2\frac{\Delta}{T_c}\right) \\ \left(1-2\frac{\Delta}{T_c}\right) & 0 & 1 & 0 \\ 0 & \left(1-2\frac{\Delta}{T_c}\right) & 0 & 1 \end{bmatrix}$$

The second filter uses early-minus-late power measurement function of the form:

$z = I_{Einc} + Q_{Einc} - I_{Linc} - Q_{Linc}$. The expected measurement is $\hat{z}=0$, the $H_1$ function can be found as set forth above, where:

$$\frac{\partial \hat{R}(\tau)^2}{\partial \tau} = \left(2 - 2\frac{\tau}{T_c}\right)\frac{1}{T_c}$$

$$R = 16\left(\frac{\Delta}{T_c} - \frac{\Delta^2}{T_c^2}\right)$$

The EKF equations are then applied in the processing circuit 24 as:

$$M_i = \Phi P_{i-1} \Phi^T + Q_i$$

$$K_i = M_i H_i^T (H_i M_i H_i^T + R)^{-1}$$

$$P_i = (I - K_i H_i) M_i$$

The second order EKF makes use of higher orders in Taylor series expansion. The state x and covariance p are updated based on the following equations:

$$\hat{x}_i^+ = \frac{E[x_i f_{x_i}(z_i \mid x_i)]}{E[f_{z_i}(z_i \mid x_i)]} \text{ and } \hat{p}_i^+ = \frac{E[x_i x_i^T f_{x_i}(z_i \mid x_i)]}{E[f_{x_i}(z_i \mid x_i)]} - \hat{x}_i^+ \hat{x}_i^{+T},$$

where $f_x$ and $f_z$ are the probability density functions of the states and the measurements, respectively. These equations are solved by expressing them as a power series with $E[h-\hat{h}]^2$. They may then be approximated by a Taylor series. A truncated second order filter (TS) ignores all central moments above the second order, while a Gaussian second order filter (GS) accounts for the fourth central moment, assuming the density is Gaussian. These filters use the Hessian matrix of h with their equations. Therefore, the TS equations implemented by the processing circuit 24 include: $M_i = \Phi P_{i-1}\Phi^T + Q_i$. A vector $b_i$ of a size that equals the number of measurements is defined as:

$$b_{ki} = \frac{1}{2}\text{trace}\left(\frac{\partial^2 h_k(x_i^-)}{\partial x^2} M_i\right)$$

$$K_i = M_i H_i^T (H_i M_i H_{1i}^T - b_i b_i^T + R)^{-1}$$

$$P_i = (I - K_i H_{1i}) M_i$$

and the GS filter equations are: $M_i = \Phi P_{i-1}\Phi^T + Q_i$ and $$b_{ki} = \frac{1}{2}\text{trace}\left(\frac{\partial^2 h_k(x_i^-)}{\partial x^2} M_i\right).$$

If m defines the number of measurements, then element kl of a matrix $B_i$ of size m×m is:

$$B_{ikl} = \frac{1}{2}\text{trace}\left(\frac{\partial^2 h_k(x_i^-)}{\partial x^2} M_i \frac{\partial^2 h_l(x_i^-)}{\partial x^2} M_i\right),$$

$K_i = M_i H_i^T (H_{1i} M_i H_{1i}^T - B_i + R)^{-1}$, and $P_i = (I - K_i H_{1i})M_i$. In both filters, the state update equation is: $x_i^+ = x_i^- + K_i(z_i - \hat{z}_i - b_i)$.

The processing circuit 24 may be programmed to implement the truncated and Gaussian second order filters in the following manner. The autocorrelation function may be approximated by quadratic function having the form: $R(\tau) = a\tau^2 + b\tau + c$. The measurement vector may be represented as:

$$z = \frac{1}{\sqrt{2}}\begin{bmatrix} I_{Einc} + Q_{Einc} \\ I_{Linc} + Q_{Linc} \\ I_{Pinc} + Q_{Pinc} \end{bmatrix}$$

The derivatives of the approximated autocorrelation function are:

$$\frac{\partial \hat{R}(\tau)^2}{\partial \tau} = 4a^2 \frac{\tau^3}{T_c^4} + 6ab\frac{\tau^2}{T_c^3} + 4ac\frac{\tau}{T_c^2} + 2b\frac{\tau}{T_c^2} + 2bc\frac{1}{T_c}$$

$$\frac{\partial^2 \hat{R}(\tau)^2}{\partial \tau^2} = 12a^2 \frac{\tau^2}{T_c^4} + 12ab\frac{\tau}{T_c^3} + 4ac\frac{1}{T_c^2} + 2b\frac{1}{T_c^2}$$

The processing circuit 24 may then find the expected measurement $H_1$ and $H_2$ by implementing these first and second derivatives for the autocorrelation function in the general expected measurement vector, the general linearized vectors, and the second derivative matrix described above.

The constants a, b, and c needed to solve for values are determined by setting R(τ) to 1 at the prompt signal and to $$1 - \frac{|\Delta|}{T_c}$$

at both the early and late signals. The constants are then obtained by solving:

$$\begin{bmatrix} 1 - \frac{|\Delta|}{T_c} \\ 1 - \frac{|\Delta|}{T_c} \\ 1 \end{bmatrix} = \begin{bmatrix} \left(-\frac{\Delta}{T_c}\right)^2 & -\frac{\Delta}{T_c} & 1 \\ \left(\frac{\Delta}{T_c}\right)^2 & \frac{\Delta}{T_c} & 1 \\ 0 & 0 & 1 \end{bmatrix}\begin{bmatrix} a \\ b \\ c \end{bmatrix}$$

and the measurement noise matrix is:

$$R = \begin{bmatrix} 1 & \left(1-2\frac{\Delta}{T_c}\right)^2 & \left(1-\frac{\Delta}{T_c}\right)^2 \\ \left(1-2\frac{\Delta}{T_c}\right)^2 & 1 & \left(1-\frac{\Delta}{T_c}\right)^2 \\ \left(1-\frac{\Delta}{T_c}\right)^2 & \left(1-\frac{\Delta}{T_c}\right)^2 & 1 \end{bmatrix}$$

In both EKFs 150 and 154, the code delay update equation is modified from the one presented above to the form: $tsNext_{new}=tsNext_{old}+estTiDuration+K_i(Res_i-b_i)$.

Because the carrier tracking VA/EKF module and the code tracking EKF module use the output from one another, the loss of a lock on a signal by one module affects the other module. One method for improving the duration of a signal lock is to enhance the stability of the carrier tracking VA/EKF module. This may be accomplished with a square root EKF. Such a filter uses an integration time multiple $N_{tcar}$ of one data bit interval, where each data bit interval contains $N_{msec}$ of 1 msec correlated data. The square root EKF uses the model described above for the other EKFs to construct the measurement vectors, H, and the residual and the measurement is based on generating an error signal proportional to the phase error. The square root EKF may be implemented using the Carlson algorithm. In this method, $S_j^-$ and $S_j^+$ are the propagated and updated square root of the covariance. $S_j^-$ may be generated from:

$$X_j = \Phi S_{j-1}^+$$

$$P_j^- = X_j X_j^T + Q_j$$

$$S_j^- = chol(P_j^-)$$

where chol is the Cholesky square root matrix of the propagated covariance $P_j^-$. $\Phi$ and Q are the transition and process noise matrices. The Carlson process finds $S_j^+$ as a solution of $$S_j^+ = S_j^- \left[ I - \frac{a_j a_j^T}{\beta_j} \right].$$

The Carlson process has the advantage of keeping the triangularity of S after updating it. The process works by calculating $S_j^+$ column by column in an iterative manner. Using n as the number of states, the process is initialized with:

$$\beta_0 = R_j$$

$$e_0 = 0$$

$$\alpha = S_j^{-T} H_j^T$$

and then the following are calculated for k=1, . . . , n:

$$\beta_k = \beta_{k-1} + \alpha_k^2$$

$$u_k = (\beta_{k-1}/\beta_k)^{1/2}$$

$$v_k = \alpha_k/(\beta_{k-1}\beta_k)^{1/2}$$

$$e_k = e_{k-1} + S_k^- \alpha_k$$

$$S_k^+ = S_k^- u_k - e_{k-1} v_k$$

where $a_k$ is the $k^{th}$ element of the vector a, $e_k$ is a vector, $S_k^+$ are column vectors that are formed as: $S_j^+ = [S_1^+ S_2^+ \ldots S_n^+]$. The gain is $$K_j = \frac{e_n}{\beta_n}.$$

A truncated second order filter and a Gaussian second order filter are implemented for carrier tracking by processing circuit 24 for the VA/EKF module. Those filters use an integration interval that is a multiple of one data bit interval. The measurement vector for these filters is:

$$z = \begin{bmatrix} Q_i \\ I_j \end{bmatrix} = \begin{bmatrix} A_j \sin(\phi_{ej}) \\ A_j \cos(\phi_{ej}) \end{bmatrix}.$$

The expected measurement is:

$$z_j = \begin{bmatrix} 0 \\ \hat{A}_j \end{bmatrix}$$

and the $H_1$ function is:

$$H_{1j} = \begin{bmatrix} \hat{A}_j & 0 & 0 \\ 0 & 0 & 0 \end{bmatrix}$$

and the $H_2$ matrices are:

$$H_{21j} = \frac{\partial^2 h_1(x_j^-)}{\partial x^2} = \begin{bmatrix} 0 & 0 & 0 \\ 0 & 0 & 0 \\ 0 & 0 & 0 \end{bmatrix} \text{ and } H_{22j} = \frac{\partial^2 h_2(x_j^-)}{\partial x^2} = \begin{bmatrix} -\hat{A}_j & 0 & 0 \\ 0 & 0 & 0 \\ 0 & 0 & 0 \end{bmatrix}.$$

The filter equations set forth above are applied and the state update equation becomes:

$$x_j^+ = x_j^- + K_j(z_j - \hat{z}_j - b_j) \text{ and}$$

$$b_j = \frac{1}{2} \text{trace}\left(\frac{\partial^2 h_k(x_i^-)}{\partial x^2} M_i\right).$$

To improve the stability of the carrier tracking VA/EKF module, a square root EKF is implemented, preferably, with reference to the Potter algorithm. The covariance update equations used for this filter are:

$$\alpha_j = \frac{1}{a_j^T a_j + R_j}$$

$$\gamma_j = \frac{1}{1 + (\alpha_j R_j)^{1/2}}$$

$$K_j = \alpha_j S_j^- a_j$$

$$S_j^+ = S_j^- - \gamma_j K_j a_j^T$$

, but they are modified because two independent measurements are used. The modified equation set is:

$$\alpha_{kj} = \frac{1}{a_{kj}^T a_{kj} + R_{kj} + B_{kj}}$$

$$\gamma_{kj} = \frac{1}{1 + (\alpha k_j (R_{kj} + B_{kj}))^{1/2}}$$

$$K_{kj} = \alpha_{kj} S_j^- a_{kj}$$

$$K_j = [K_{1j} \quad K_{2j}]$$

$$\kappa_j = [\gamma_{1j} K_{1j} \quad \gamma_{2j} K_{2j}]$$

$$S_j^+ = S_j^- - \kappa_j a_j^T$$

where k is the number of measurements, $a_k$ refers to the $k^{th}$ column of a, $R_k$ refers to the diagonal element k of the measurement noise matrix, and $B_k$ refers to the diagonal element k of $$B_{ikl} = \frac{1}{2} \text{trace}\left(\frac{\partial^2 h_k(x_i^-)}{\partial x^2} M_i \frac{\partial^2 h_l(x_i^-)}{\partial x^2} M_i\right).$$

An increase in the noise variance input to the tracking modules decreases the mean time for losing a lock on a signal. Increasing integration time reduces noise variance. The processing circuit 24 may be further enhanced to minimize noise variance in the tracking modules and, correspondingly, increase the tracking time.

One method enhances the EKF module used to track the code signal. This enhancement is implemented by having the coherent and incoherent integrations, as well as the total integration, change with time. Initially, the coherent integration is set to a maximum value in response to the current data being correctly detected and the frequency tracking error is small. If either of these conditions is not present, then the coherent integration is set to a minimum value. The total integration time is initially set to a small value to achieve rapid convergence in the EKF. If current data are correctly detected and the frequency tracking error is small, the total integration time is gradually increased to a large value to minimize noise variance.

The code tracking module is updated every $T_t$ seconds. The carrier tracking module is updated every $T_d$ seconds, where $T_d$ is one data bit interval. Thus, the prompt, early, and late correlated signals are generated with $T_d$ integration time. Large errors in the frequency estimate can be detected if the bit error rate (BER) is high. The BER is determined by comparing saved repeated data that have been previously detected to the signs of the currently received repeated data. The result of the comparison is used to help adjust the coherent integration and to assist in frequency re-initialization.

Figure 5:
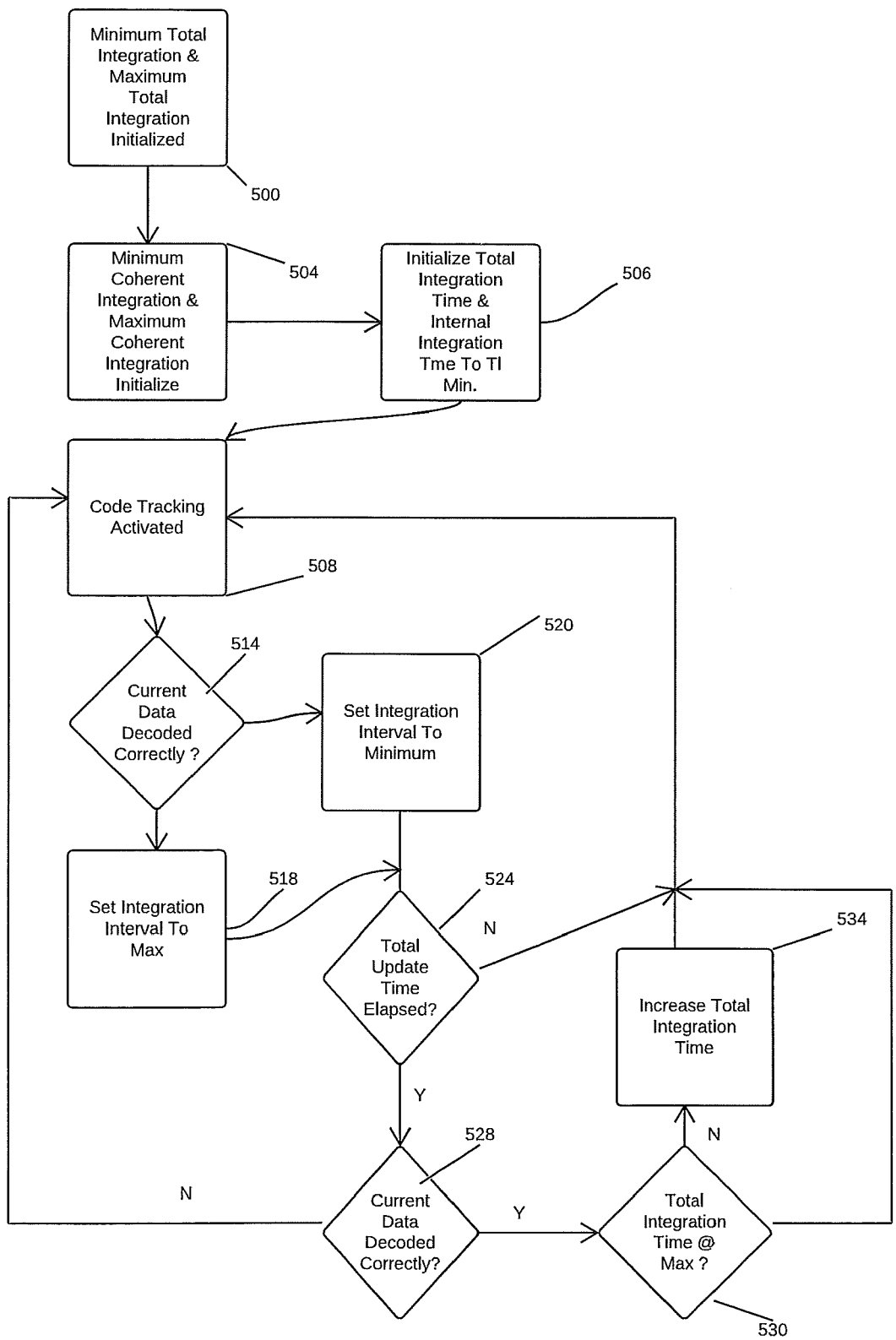
FIG. 5 shows a flow diagram for an exemplary adaptive integration time process used to adjust the operation of the code tracking module shown in the system of FIG. 4.

This process, known as adaptive integration time, is shown in FIG. 5. The minimum total integration is set to $T_{tmin}$ and the maximum to $T_{tmax}$ (block 500). The minimum coherent integration time, $T_{Imin}$ and the maximum coherent integration time, $T_{Imax}$ is also initialized (block 504). Also, the total integration time and the interval integration time are initialized to $T_{Imin}$ (block 506). The code tracking module total integration time is set to Ttmin and the interval integration time is set to TImin. The code tracking module receives its initial data from the acquisition module and begins tracking the signal (block 508). At the end of each update period Tt and before the code tracking output is generated, the coherent and incoherent integration times are adjusted. If the current data are decoded correctly (block 514), then the coherent integration interval is set to the maximum value, $T_{Imax}$.(block 518). Otherwise, the coherent integration interval is set to the minimum value, $T_{Imin}$ (block 520). Also, the module determines whether a total integration update time has elapse (block 524). If it has not elapsed, the tracking continues. Otherwise, the process determines whether the last data were correctly decoded (block 528). If they were, the total integration time is tested to determine whether it is at the total integration time maximum (block 530). If it is, then the process continues. Otherwise, the total integration time is increased by a total integration time increment (block 534) and the process continues. If the current data are not correctly decoded, then the integration time interval and the total integration time are re-initialized to the minimums.

Figure 6:
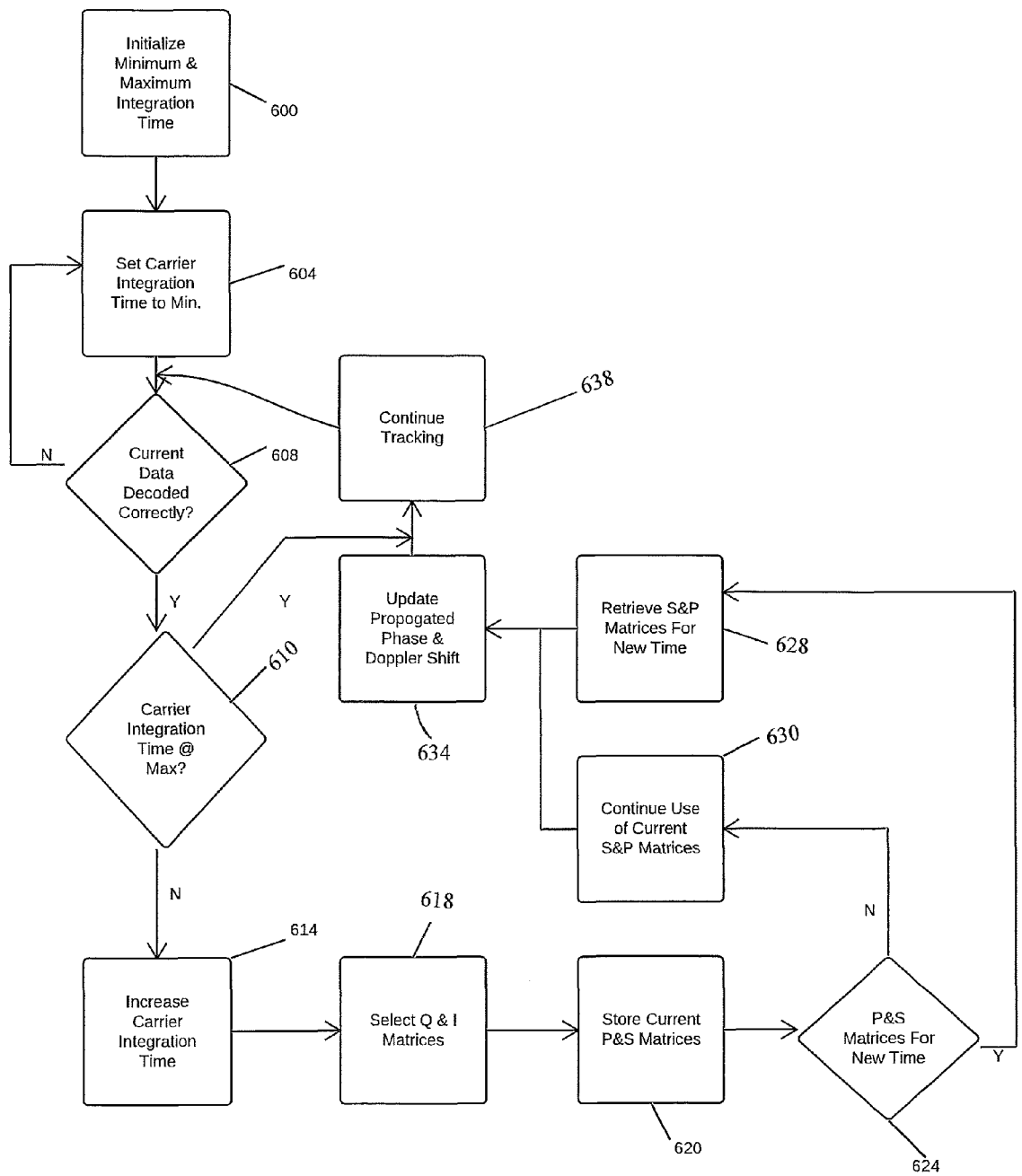
FIG. 6 is a flow diagram for an exemplary adaptive integration time process used to adjust the operation of the carrier tracking module shown in the system of FIG. 4.

The carrier tracking module uses coherent integration only. The adaptive integration process for this module is shown in FIG. 6. After a minimum time, $T_{Icmin}$, and a maximum time, $T_{Icmax}$, are initialized (block 600), the carrier integration time $T_{ic}$ is set to the minimum time (block 604). At the end of each carrier integration period, the carrier integration time is increased (block 614), if the data were correctly decoded (block 608) and the maximum carrier integration time has not been reached (block 610). The state transition (Φ) and process noise (Q) matrices are selected to correspond to the new $T_{ic}$ (block 618). These matrices are calculated once for each possible integration time length and stored for later use. The covariance matrix P and the square root covariance matrix S are updated and propagated for each $T_{ic}$. Thus, upon selection of a $T_{ic}$, the process stores the current matrix (block 620) and determines whether a previous matrix has been stored for the newly selected $T_{ic}$ (block 624). If one was stored, then it is retrieved and used during the next integration interval (block 628). Otherwise, the current matrix is used (block 630). The propagated phase and Doppler shift are recalculated (block 634), but the current Doppler rate continues to be used and tracking continues (block 638).

The carrier tracking EKF converges provided the frequency error is less than 12 Hz. If the frequency error is greater than about 3-5 Hz, the time for convergence may substantially increase and data bit estimation degrades. This error also affects the code tracking EKF because the carrier output is used by the code tracking EKF. If the frequency estimation error goes above about 12 Hz, the carrier tracking EKF diverges, which further impacts the code tracking. To minimize these issues, a frequency re-initialization module is implemented. This error is detected when the BER is high, which in one embodiment occurs when it reaches 0.3-0.5 over a large number of data words. The BER is checked for correctly decoded words and each time it is greater than a minimum threshold, a counter is incremented. If the threshold is not reached, the counter is reset to zero. If the counter reaches a maximum threshold, a frequency error is detected. In response, the carrier tracking EKF is disabled and the extended states Viterbi algorithm performed to re-initialize the frequency. The new frequency estimation is provided to the carrier tracking EKF and the module is reactivated. A test is also conducted to determine whether the code tracking module requires re-initialization. If a large reduction in the received signal level is detected, then the code tracking module operation is terminated and a new code delay is estimated using a process similar to the acquisition process discussed above. The process for estimating the new code delay searches for the correct code delay using a few of the delays that are located around the current code delay estimate. This new code delay is provided to the code tracking EKF and it is reactivated.

A large early signal/late signal separation for the code signal helps maintain signal lock if the expected code delay error estimation is large. A small separation, however, gives better delay error estimation. To take advantage of the benefits of these different separations, the delay separation is also adaptively adjusted. If $N_\Delta$ is the number of delays used, then $N_\Delta$ number of EKFs are used, one for each $\Delta$. Each EKF generates an independent residual and H functions, but only one update/propagate step is performed to estimate the current T and the start of the next integration interval. This is done by calculating an average of the $(K_i, Res_i)$ values. This may be represented as $$tsNext_{new} = tsNext_{old} + estTiDuration + \frac{1}{N_\Delta} \sum_{m=1}^{N_\Delta} K_{i,m} Res_{i,m}.$$

The delay $\Delta$ may be set to a large value at the beginning of code tracking and, also immediately after re-acquisition process. Otherwise, it may be set to either a small value or more than one $\Delta$ may be used. Another alternative is to use only one EKF for all of the used delays. In this case, the measurement, the expected measurement, and the linearization functions are extended to include all of the used delays.

Figure 7:
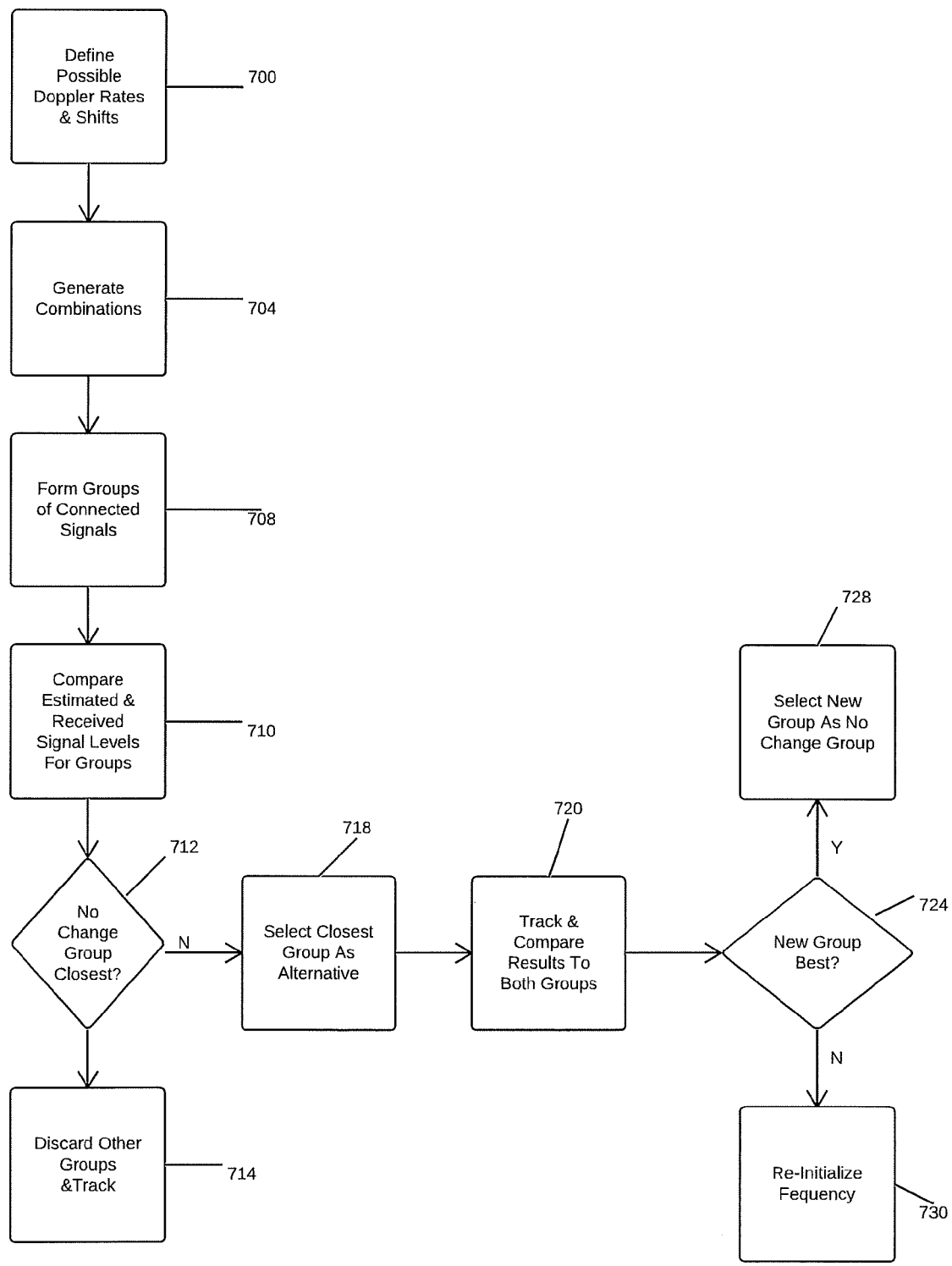
FIG. 7 shows a flow diagram for an exemplary process for detecting Doppler rate or Doppler shift that requires frequency re-initialization of the system shown in FIG. 4.

Doppler shift corresponds to the line of sight velocity of the receiver relative to the satellite, while Doppler rate corresponds to the acceleration of the receiver relative to the satellite. If these changes do not occur very often then reacquisition may be used provided the acquisition time is smaller than the time between acceleration or velocity changes. If the changes are more frequent than the acquisition time, the process of FIG. 7 may be used. First, a number of possible Doppler rates and possible Doppler shifts are defined (block 700) and the combinations of these rates and shifts are defined (block 704). $N_{va}$ defines the number of possible combinations. In each tracking step, $N_{va}$ groups of correlated signals (early, late, and prompt) are formed (block 708). One of these groups, $G_c$, is formed with no change in either velocity or acceleration, while the other $N_{va}$ groups indicate a change in one or both of these parameters. Compare the signal levels for the groups with an estimated signal level (block 710). If the estimated signal level and the signal level for $G_c$ are approximately the same (block 712), then the other groups are discarded and tracking continues (block 714). Otherwise, the group having the maximum signal value is selected and denoted as $G_m$ (block 718). If a new group is selected, then both $G_c$ and $G_m$ are used to track for a few steps (block 720). If $G_m$ results in acceptable tracking (block 724), then replace $G_c$ with $G_m$ (block 728). Otherwise, the frequency re-initialization is activated (block 730).

Because the acquisition and tracking methods are dealing with weak signals, the theoretical BER is high and does not enable decoding of the navigation message. Using the fact that certain portions of the navigational message are repeated, a process can detect and decode the navigation message in weak signal conditions. This process is directed to detecting and decoding a navigation message that consists of five sub-frames. Each sub-frame is transmitted over six seconds and consists of an 8-bit preamble and ten 30-bit words. The second word of each sub-frame contains a three bit sub-frame identifier at bits 20-22 of the word. Bits 25-30 of each word contain a parity check for that word. Each word in a sub-frame may be independently decoded except for the last two bits of the previous word.

Figure 8:
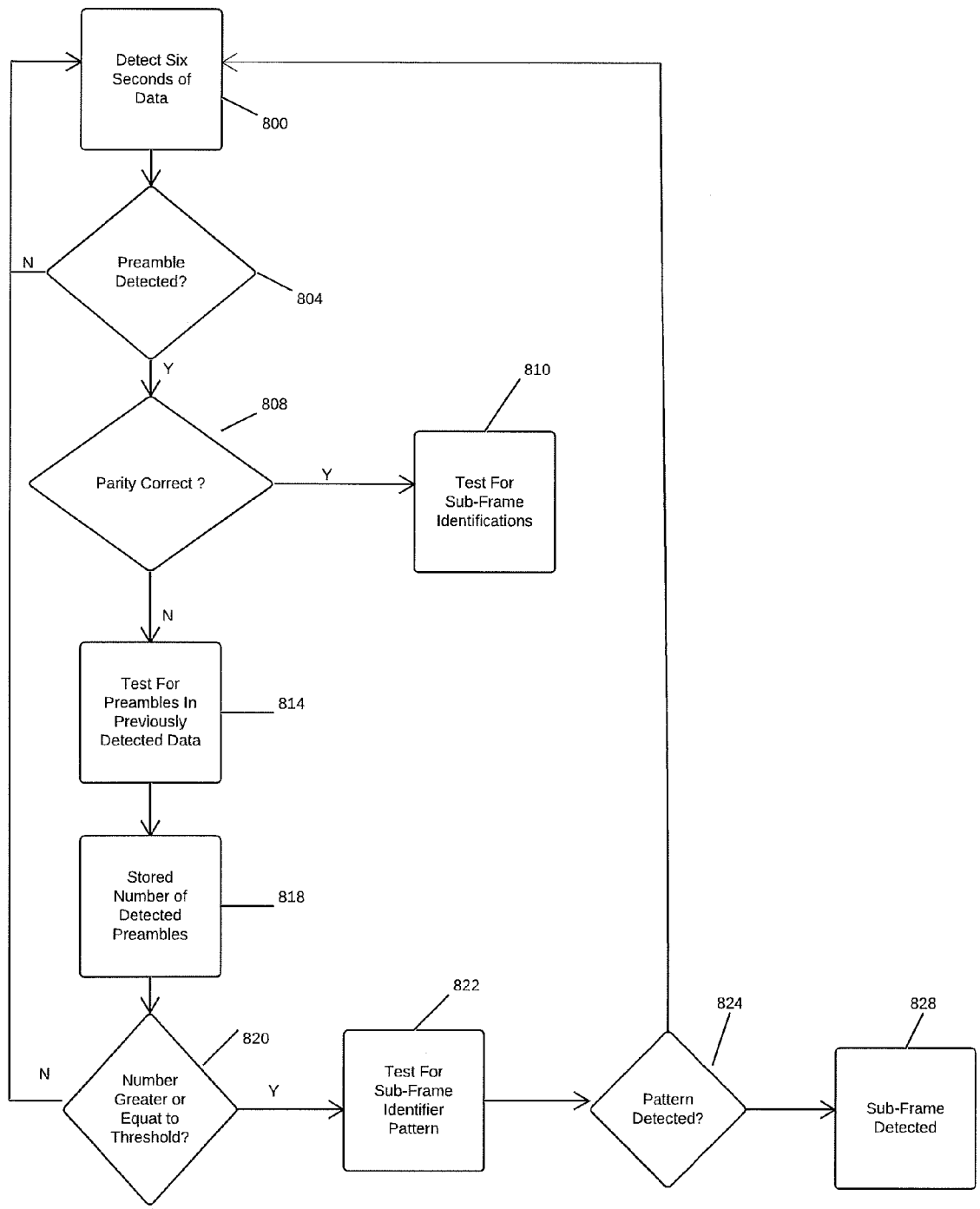
FIG. 8 shows a flow diagram for an exemplary process for decoding a preamble in a navigation message.

The process shown in FIG. 8 may be used to detect the preamble of a sub-frame. The process begins by detecting six seconds of data bits (block 800). This detection may be achieved with the Viterbi process noted above. This detected data is searched for all sequences that correspond to a preamble (block 804). If no preambles are detected, the process repeats the data detection and searching (blocks 800 and 804). Upon detection of one or more preambles, the parity bits of the word, which follows the preamble, are tested for parity correctness (block 808). If parity is correct, then the data are tested for sub-frames identifiers (block 810). If parity is not correct for a preamble candidate, then test the words from previously detected six second groups that correspond to the same word index position for the preamble at the start of the word (block 814). Store the number of preambles detected, $N_{preamble}$ (block 818). If the number of preambles is equal to or greater than a minimum threshold, $N_{min}$ (block 820), test all sub-frame identifiers associated with the detected preambles for correspondence with an expected pattern of sub-frame identifiers (block 822). If no expected pattern is found (block 824), then the process begins again (block 800). Otherwise, a sub-frame sequence has been determined (block 828).

Sub-frame pattern detection may occur by decoding the sub-frame identifier in the second word of a sub-frame or by detecting a sub-frame pattern identifier in the detected data. With five sub-frames, the sub-frame identifiers may have a value of 000 to 101. As already noted, these sub-frame identifiers are stored in bits 20-22 of the second word in a sub-frame. Depending upon which sub-frame identifier is decoded, the following patterns of sub-frame identifiers are possible in a six second group of detected data:

Pattern$_1$=[001 010 011 100 101]
Pattern$_2$=[010 011 100 101 001]
Pattern$_3$=[011 100 101 001 010]
Pattern$_4$=[100 101 001 010 011]
Pattern$_5$=[101 001 010 011 100]

Figure 9:
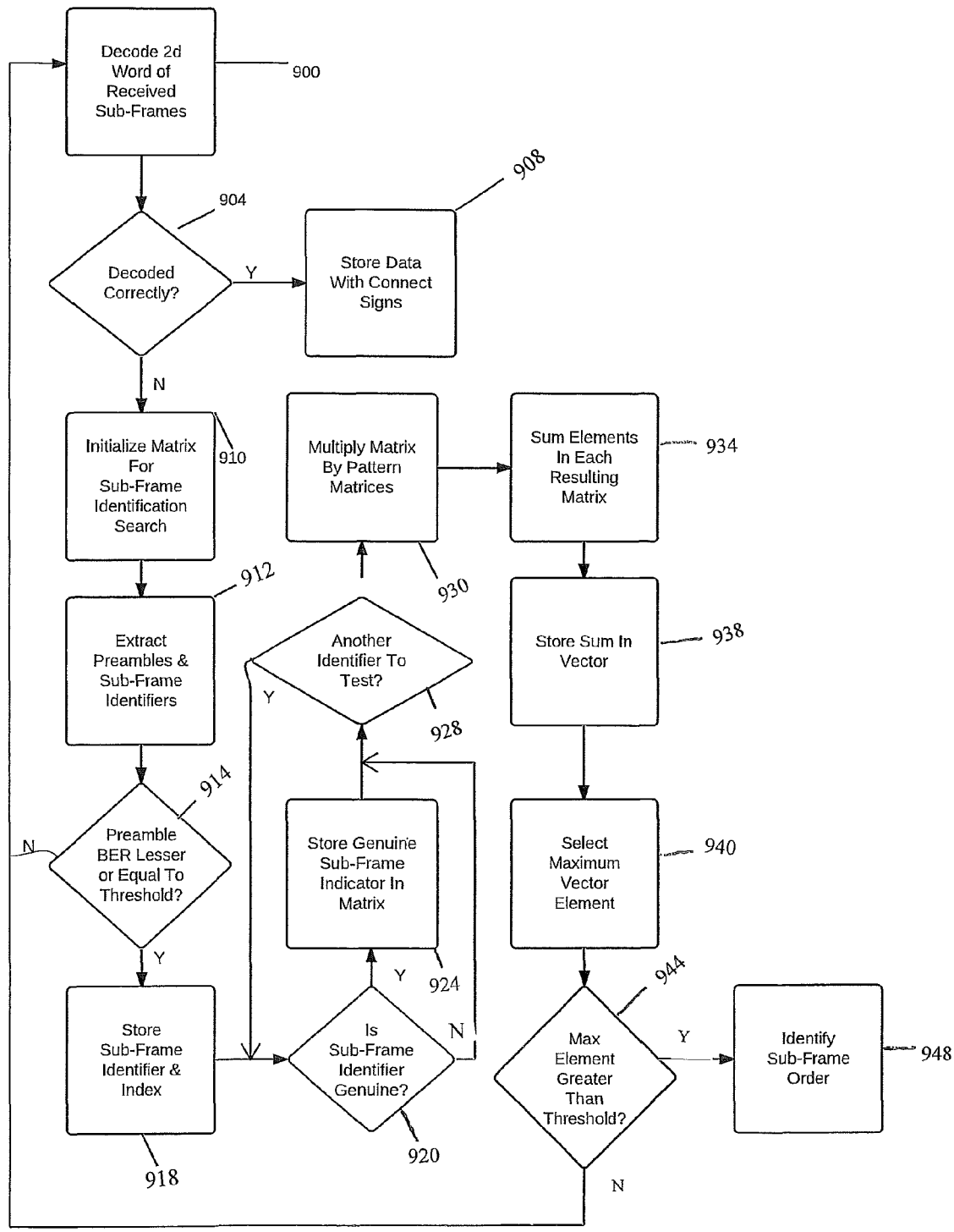
FIG. 9 shows a flow diagram for an exemplary process for detecting a sub-frame identifier sequence in a navigation message.

A process using this pattern information is depicted in FIG. 9. Once a preamble is detected, the second word of each received sub-frames is decoded (block 900). If the second words are correctly decoded (block 904), the sub-frame identifier pattern matches one of the patterns above and the data are decoded and stored with the correct signs for use by the EKFs 150 and 154 (block 908). Even if a sub-frame identifier is identified with reverse signs of bits 20-22 in one of the decoded words, the other four sub-frame identifiers may still be construed from the corresponding pattern. If no word is correctly decoded, then a matrix $M_{sub}$ Of size $N_{sub} \times N_{sub}$ is initialize to zero (block 910). $N_{sub}$ is the number of sub-frames, which is five. The preamble and sub-frame identifiers from the second word in all received sub-frames are extracted (block 912). If the BER for the preamble is less than or equal to a predefined threshold $y_{preamble}$ (block 914), then store the sub-frame identifier and its index (block 918), $n_{sub}$, which defines an index in the range of 1-5 that refers to the order of the sub-frame within the received sequence of sub-frames. Otherwise, the process begin again (block 900). For each stored sub-frame identifier, determine whether they correspond to a genuine sub-frame identifier (block 920). If correspondence exists, a 1 is stored (block 924) in the $M_{sub}$ matrix at position $n_{sub}, n_{ID}$, where $n_{ID}$ refers to the genuine sub-frame identifier value. After all of the sub-frame identifiers have been tested (block 928), the matrix $M_{sub}$ is multiplied by the following $M_{pattern}$ matrices on an element wise basis (block 930).

$$M_{pattern_1} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

$$M_{pattern_2} = \begin{bmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ 1 & 0 & 0 & 0 & 0 \end{bmatrix}$$

$$M_{pattern_3} = \begin{bmatrix} 0 & 0 & 1 & 0 & 0 \\ 0 & 0 & 0 & 1 & 0 \\ 0 & 0 & 0 & 0 & 1 \\ 1 & 0 & 0 & 0 & 0 \\ 0 & 1 & 0 & 0 & 0 \end{bmatrix}$$

$$M_{pattern_4} = \begin{bmatrix} 0 & 0 & 0 & 1 & 0 \\ 0 & 0 & 0 & 0 & 1 \\ 1 & 0 & 0 & 0 & 0 \\ 0 & 1 & 0 & 0 & 0 \\ 0 & 0 & 1 & 0 & 0 \end{bmatrix}$$

$$M_{pattern_5} = \begin{bmatrix} 0 & 0 & 0 & 0 & 1 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{bmatrix}$$

The elements of each resulting matrix are summed (block 934) and the sum is stored in a vector $\Lambda$ (block 938). In this storage, the $i^{th}$ result is stored in the $i^{th}$ element of $\Lambda$, which is defined as $\Lambda_i$. Select the maximum value in $\Lambda$ (block 940) and determine whether it exceeds a threshold $ID_{th}$ (block 944). If it does, then the index m for the maximum element is used to select the $m^{th}$ row (block 948) of matrix orderID, which identifies the received sub-frame order. The matrix orderID is defined as:

$$orderID = \begin{bmatrix} 1 & 2 & 3 & 4 & 5 \\ 2 & 3 & 4 & 5 & 1 \\ 3 & 4 & 5 & 1 & 2 \\ 4 & 5 & 1 & 2 & 3 \\ 5 & 1 & 2 & 3 & 4 \end{bmatrix}$$

If there is no maximum element in $\Lambda$, then, upon detection of the next second word in the next sub-frame, the process begins again (block 900).

Figure 10:
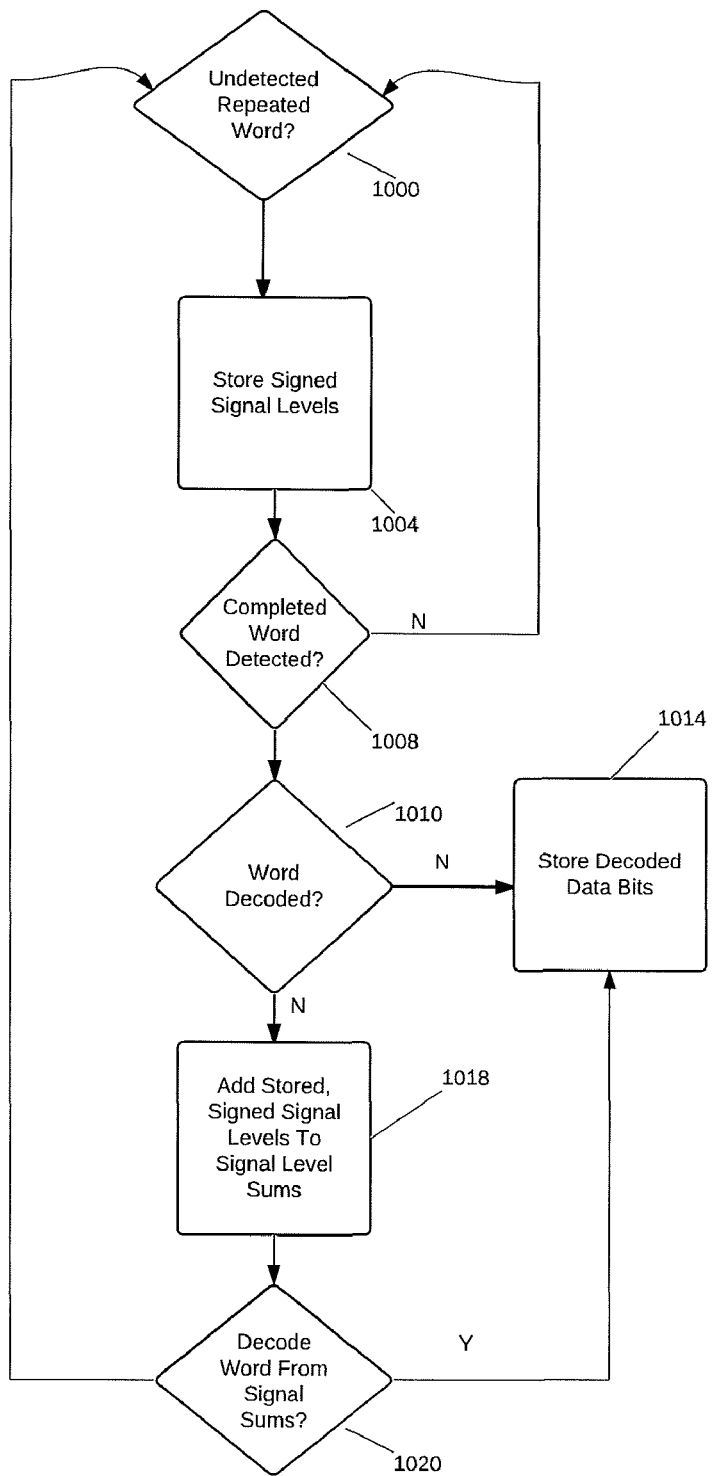
FIG. 10 shows a flow diagram for an exemplary process for decoding repeated data words in a navigation message.

The data in the five sub-frames also has a repeating pattern in it. Words 3-10 of sub-frames 1-3 repeat every 30 seconds. Words 3-10 of sub-frames 4 and 5 repeat every 12.5 minutes. These patterns may be used to detect the repeated data bits in very weak signals. Such a process is shown in FIG. 10. If a currently received word is undetected and is one of the repeated words (block 1000), then its signed signal levels are stored in a matrix $V_{sig}$ of size $N_{bits}$ (block 1004), which is the number of data bits in a sub-frame. After detection of the complete word (block 1008), then attempt to decode the word (block 1010). If the word is decoded, then store the decoded data in $M_{bit}$ (block 1014), which is a matrix of size $N_{sub} \times N_{bits}$, where $N_{bits}$ is the number of bits in a sub-frame. Thus, correctly decoded bits are stored in the $M_{bit}$ matrix. If the word is not correctly decoded, then add the signed signal levels of that word that were stored in $V_{sig}$ to those stored in the corresponding locations in a matrix $Mt_{sig}$ (block 1018). $M_{tsig}$ is a matrix of size $N_{sub} \times N_{bits}$, in which the summation of the signed signal levels for the repeated bits that have not yet been detected are stored. An attempt to decode the word in $Mt_{sig}$ is made (block 1020). If the attempt is successful, then the data bits of the correctly decoded word are stored in $M_{bit}$ (block 1024). Otherwise, the process continues looking for detected data bits for decoding (block 1000).

The stored data for the currently received word that has been successfully decoded are used in EKFs 150, 154 for code and carrier tracking. If the current data sequence is being detected with correct signs, then the stored data are used with the signs. Otherwise, the stored data are used with reversed signs. This use avoids using data with incorrect relative signs if the integration interval contains some data bits that have already been detected and others that have not been detected. The signs of the current detected sequence are found from the signs of the data in $V_{sig}$, which can be compared against the stored sequence in $M_{bit}$ to determine whether a 180° phase error exists.

The above described embodiment and variants thereof are merely exemplary and those of ordinary skill in the art may readily devise their own implementations that incorporate the principles of the present invention and fall within the scope and spirit thereof. For example, the description above relates to the acquisition and tracking of the C/A code received from a satellite in a GPS environment. The principles set forth above may be adapted to process other code signals received from transmitters in positioning systems.

We claim:

1. A method of acquiring a signal in a GPS receiver in a high dynamic environment comprising:
    generating a first set of acquired signal power values, the first set comprising an acquired signal power value for each Doppler bin in a plurality of Doppler bins over a first predetection integration time (PIT) interval for processing a digital signal;
    generating a second set of acquired signal power values, the second set comprising an acquired signal power value for each Doppler bin in the plurality of Doppler bins over a second subsequent predetection integration time (PIT) interval for processing the digital signal;
    generating at least three additional sets of acquired signal power values from the first and the second sets, one of the additional sets of acquired signal power values is a set of summations of the acquired power value for each Doppler bin in the first set of values with the acquired power value for the Doppler bin in the second set of acquired power signal values, another of the additional sets of acquired signal power values correspond to a set of summations of the acquired power value for each Doppler bin in the first set of acquired power values with the acquired power value for the Doppler bin in the second set that precedes the Doppler bin in the first set of acquired power values, and the other of the additional sets of acquired signal power values is a set of summations of the acquired power value for each Doppler bin in the first set of acquired power values with the acquired power value for the Doppler bin in the second set that follows the Doppler bin in the first set of acquired power values;

generating a new set of acquired power values by selecting the maximum of the summations for each Doppler bin from the three additional sets; and identifying a Doppler shift for a signal acquisition in response to an acquired power value in the new set of acquired power values being greater than a threshold value.

2. The method of claim 1, the generation of the first and the second sets of acquired power values over the first and the second PIT intervals further comprising:

determining an incoherent integration for each Doppler bin.

3. The method of claim 2, the incoherent integration being determined with a circular correlation technique.

4. The method of claim 2, the incoherent integration being determined with a double block zero padding technique.

5. The method of claim 1 further comprising:
separating the Doppler bins in the plurality of Doppler bins by $1/T_I$ KHz, where $T_I$ is a PIT interval.

6. The method of claim 1 further comprising:
tracking a carrier signal with a Viterbi algorithm/extended Kalman filter (VA/EKF) module; and
tracking a code signal with a second extended Kalman filter module.

7. The method of claim 6 further comprising:
providing output from the VA/EKF module to the second extended Kalman filter module; and
providing output from the second extended Kalman filter module to the VA/EKF module.

8. The method of claim 7 further comprising:
filtering the carrier signal with a square root EKF to enhance the stability of the VA/EKF module.

9. The method of claim 8 further comprising:
filtering the code signal with a square root EKF to enhance the stability of the second EKF module.

10. A method for tracking signals in a global positioning system comprising:
tracking a carrier signal with a first extended Kalman filter (EKF); and
tracking a code signal with a second EKF.

11. The tracking method of claim 10 further comprising:
operating the first extended EKF with a first integration time; and
operating the second EKF with a second integration time.

12. The tracking method of claim 11 further comprising:
adaptively adjusting the first integration time; and
adaptively adjusting the second integration time.

13. The tracking method of claim 12 further comprising:
correcting large carrier errors by re-initializing the first EKF.

14. The tracking method of claim 12 further comprising:
correcting large code delay errors by a reacquisition process.

15. The tracking method of claim 12 further comprising:
decoding a navigational data message in a weak signal with reference to repeated portions of a navigational message.

16. A receiver for acquiring and tracking signals in a global positioning system comprising:
a first extended Kalman filter (EKF);
a second EKF; and
the output of the first EKF being used by the second EKF for tracking a code signal and the output of the second EKF being used by the first EKF for tracking a carrier signal.

17. The receiver of claim 16 wherein said first and said second EKFs have different integration times.

18. The receiver of claim 17 wherein the integration times for the first and the second EKFs are adaptively adjusted in response to signal level or decoding error rate.

19. The receiver of claim 18 wherein the second EKF uses more than one code delay separation.

20. The receiver of claim 16 wherein the first and the second EKFs are used for acquiring a signal from satellites in a global positioning system and an estimated Doppler shift, Doppler rate, phase, and code delay obtained during acquisition of the signal are used to initialize the first and the second EKFs for tracking of a carrier signal by the first EKF and for tracking of a code signal by the second EKF.

* * * * *